United States Patent [19]
Oka

[11] Patent Number: 5,745,688
[45] Date of Patent: Apr. 28, 1998

[54] TELEWRITING TERMINAL SYSTEM PERFORMING ADDING/DELETING OPERATION OF AN IMAGE BASED ON CONTROL INFORMATION

[75] Inventor: Kouji Oka, Isehara, Japan

[73] Assignee: Ricoh Company, Ltd., Tokyo, Japan

[21] Appl. No.: 590,332

[22] Filed: Jan. 23, 1996

[30] Foreign Application Priority Data

Feb. 28, 1995 [JP] Japan ................................. 7-040545
Jul. 27, 1995 [JP] Japan ................................. 7-191411

[51] Int. Cl.$^6$ ......................... G06F 15/16; G06F 15/173; H04N 1/32
[52] U.S. Cl. ..................... 395/200.34; 395/330; 345/2; 358/436; 358/468; 178/18
[58] Field of Search ............................. 358/468, 452, 358/453, 448, 434–436; 348/15, 13; 178/18; 379/158, 201–206, 93, 96, 100; 395/200.04, 329, 330, 792, 331, 332, 200.03, 712, 772, 617, 619; 345/1, 2; 370/270, 260

[56] References Cited

U.S. PATENT DOCUMENTS

| | | | |
|---|---|---|---|
| 4,430,526 | 2/1984 | Brown et al. | 178/18 |
| 4,980,761 | 12/1990 | Natori | 348/15 |
| 5,043,919 | 8/1991 | Callaway et al. | 395/329 |
| 5,119,319 | 6/1992 | Tanenbaum | 395/200.35 |
| 5,521,335 | 5/1996 | Oka | 178/18 |
| 5,530,795 | 6/1996 | Wan | 395/200.35 |
| 5,596,721 | 1/1997 | Masse et al. | 395/200.35 |
| 5,608,872 | 3/1997 | Schwartz et al. | 395/200.35 |
| 5,649,104 | 7/1997 | Carleton et al. | 395/200.34 |

FOREIGN PATENT DOCUMENTS

| | | |
|---|---|---|
| 61-9073 | 1/1986 | Japan . |
| 2-230437 | 9/1990 | Japan . |
| 3-133244 | 6/1991 | Japan . |
| 3-150989 | 6/1991 | Japan . |
| 4-241054 | 8/1992 | Japan . |
| 5-56425 | 3/1993 | Japan . |

*Primary Examiner*—Scott Rogers
*Attorney, Agent, or Firm*—Oblon, Spivak, McClelland, Maier & Neustadt, P.C.

[57] ABSTRACT

A telewriting system has a plurality of telewriting terminals connected with a communication line, each of the telewriting terminals having a display unit so as to display an image thereon. The image displayed on the display unit is changed in accordance with instruction information transmitted via the communication line. A server unit is connected to each of the telewriting terminals by the communication line. The server unit communicates with the telewriting terminals, and has an image memory to store image information corresponding to the image displayed on the display unit. The image information to be stored in the image memory is changed, when the instruction information requesting a change of the image is received from the telewriting terminals, in accordance with the received instruction information. Differential information between the image information before the change and the image information after the change is extracted. The differential information is distributed to each of the telewriting terminals.

15 Claims, 18 Drawing Sheets

FIG. 15A

DOCUMENT NUMBER NOTIFICATION REQUEST INFORMATION
(FROM CLIENT UNIT)

| TYPE OF COMMAND (REQUEST) | 0 |
| --- | --- |
| COMMAND CODE (DOCUMENT NUMBER NOTIFICATION) | 1 |
| DOCUMENT NUMBER ( = N ) | 2 |
| DOCUMENT NAME (TEST DOCUMENT) | 3 |

FIG. 15B

DOCUMENT NUMBER NOTIFICATION CONFIRMATION INFORMATION
(FROM SERVER UNIT)

| TYPE OF COMMAND (CONFIRMATION) | 0 |
| --- | --- |
| COMMAND CODE (DOCUMENT NUMBER NOTIFICATION) | 1 |
| DOCUMENT NUMBER ( = N ) | 2 |
| DOCUMENT NAME (TEST DOCUMENT) | 3 |

FIG. 15C

DOCUMENT NUMBER NOTIFICATION INSTRUCTION INFORMATION
(FROM SERVER UNIT)

| TYPE OF COMMAND (INSTRUCTION) | 0 |
| --- | --- |
| COMMAND CODE (DOCUMENT NUMBER NOTIFICATION) | 1 |
| DOCUMENT NUMBER ( = N ) | 2 |
| DOCUMENT NAME (TEST DOCUMENT) | 3 |

FIG. 15D

DOCUMENT NUMBER NOTIFICATION RESPONSE INFORMATION
(FROM CLIENT UNIT)

| TYPE OF COMMAND (RESPONSE) | 0 |
| --- | --- |
| COMMAND CODE (DOCUMENT NUMBER NOTIFICATION) | 1 |
| DOCUMENT NUMBER ( = N ) | 2 |
| DOCUMENT NAME (TEST DOCUMENT) | 3 |

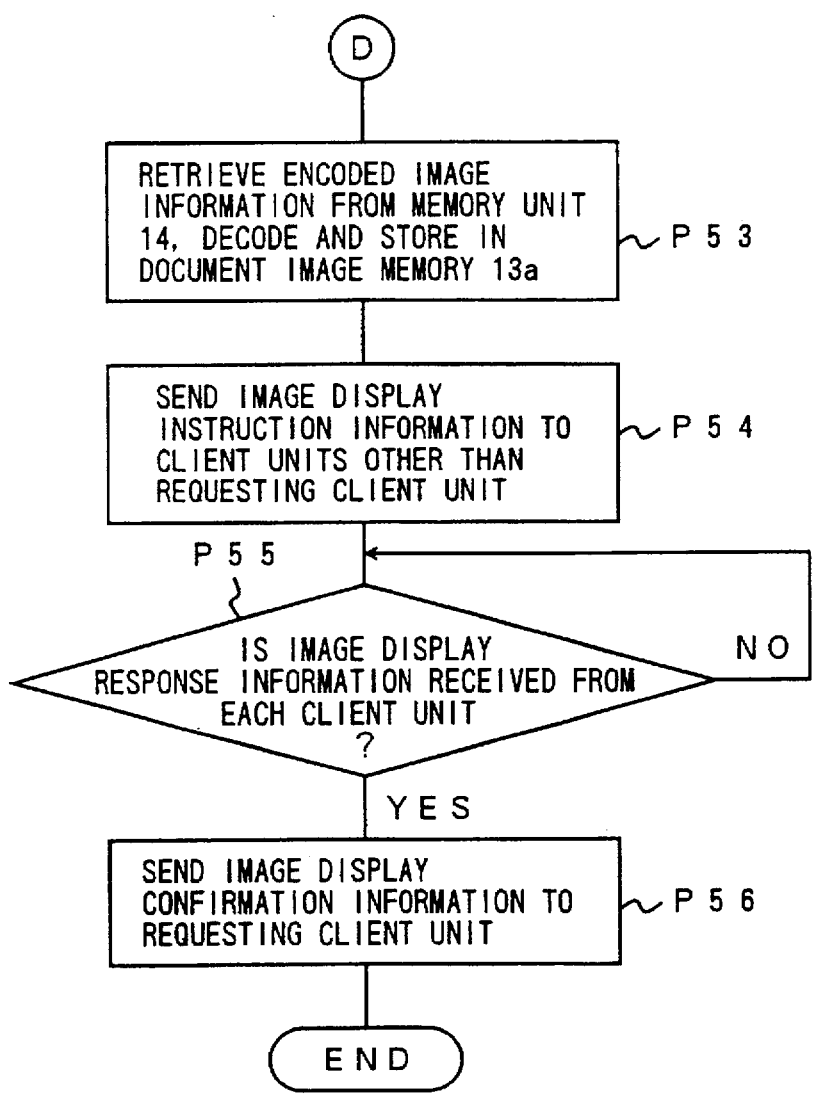

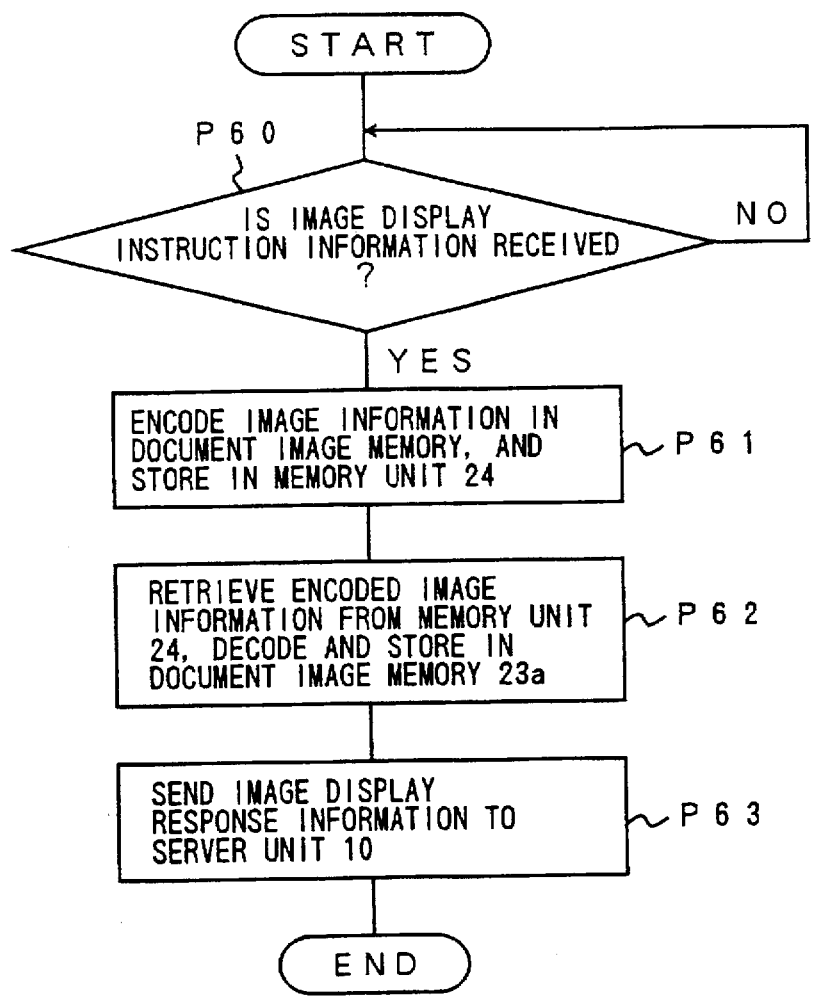

FIG. 20A

IMAGE DISPLAY REQUEST INFORMATION (FROM CLIENT UNIT)

| TYPE OF COMMAND (REQUEST) | 0 |
| --- | --- |
| COMMAND CODE (IMAGE DISPLAY) | 1 |
| DOCUMENT NUMBER (= N) | 2 |
| DISPLAY AREA NUMBER (= m) | 3 |
| PAGE NUMBER (= n) | 4 |

FIG. 20B

IMAGE DISPLAY CONFIRMATION INFORMATION (FROM SERVER UNIT)

| TYPE OF COMMAND (CONFIRMATION) | 0 |
| --- | --- |
| COMMAND CODE (IMAGE DISPLAY) | 1 |
| DOCUMENT NUMBER (= N) | 2 |
| DISPLAY AREA NUMBER (= m) | 3 |
| PAGE NUMBER (= n) | 4 |

FIG. 20C

IMAGE DISPLAY INSTRUCTION INFORMATION (FROM SERVER UNIT)

| TYPE OF COMMAND (INSTRUCTION) | 0 |
| --- | --- |
| COMMAND CODE (IMAGE DISPLAY) | 1 |
| DOCUMENT NUMBER (= N) | 2 |
| DISPLAY AREA NUMBER (= m) | 3 |
| PAGE NUMBER (= n) | 4 |

FIG. 20D

IMAGE DISPLAY RESPONSE INFORMATION (FROM CLIENT UNIT)

| TYPE OF COMMAND (RESPONSE) | 0 |
| --- | --- |
| COMMAND CODE (IMAGE DISPLAY) | 1 |
| DOCUMENT NUMBER (= N) | 2 |
| DISPLAY AREA NUMBER (= m) | 3 |
| PAGE NUMBER (= n) | 4 |

TELEWRITING TERMINAL SYSTEM PERFORMING ADDING/DELETING OPERATION OF AN IMAGE BASED ON CONTROL INFORMATION

BACKGROUND OF THE INVENTION

1. Field of the Invention

The present invention generally relates to a telewriting system having a plurality of telewriting terminals communicating via a communication line such as an integrated services digital network (ISDN), a public telephone line network or an exclusive communication line network, and more particularly to a telewriting system having a telewriting terminal communicating with remote telewriting terminals which always display the same information on their screens.

2. Background of the Invention

In a conventional telewriting system, in which a plurality of telewriting terminal apparatuses are connected via a communication line to perform such as a video conference, the same information is displayed on a screen of each of the telewriting terminal apparatuses. Hereinafter, a telewriting terminal apparatus is simply referred to as "a terminal". The same information can be displayed on each screen, when a change of the information is requested by one of the terminals, by communicating the telewriting information between the terminals.

In order to add or delete contents of information displayed on the screen, a control right (a correcting right) is given to one of the terminals so that two processes such as an adding operation and a deleting operation originated by different terminals are not performed at the same time. However, a transferring operation of the control right is inconvenient, particularly, when a discussion becomes excited.

Japanese Laid-Open Patent Application No. 3-150989 discloses a telewriting system in which addition or correction information generated in a terminal having no control right is transferred to a terminal having a control right. The terminal having a control right determines whether or not the addition or correction information is allowable. In this telewriting system, since the terminal having a control right must manage requests for addition or correction made by a plurality of terminals, there is a problem in that an operation performed by the terminal having a control right becomes complex.

Japanese Laid-Open Patent Application No. 4-241054 discloses an image communication system which eliminates transfer of the control right. In this system, addition information is temporarily stored when an adding operation and a deleting information are initiated at the same time. If the deleting operation and the adding operation are initiated at the same time, the stored addition information is read out after the operations are completed, and then the adding operation is performed again so as to avoid inconsistency. This method is effective for a point-to-point connection system. However, when this method is applied to a point-to-multipoint connection system, the operation becomes more complex as the number of terminals is increased. Thus, this system is not suitable for practical use.

Japanese Laid-Open Patent Application No. 2-230437 discloses a file managing method for a video conference system. According to this method, materials used for a video conference are distributed from a terminal which is defined as a distributing terminal to each terminal defined as a receiving terminal. Each of the materials is provided with material managing information by which each of the materials can be identified. When the materials are revised by the receiving terminals, revision information, which corresponds to a difference between the original material and the revised material, is sent to the distributing terminal so that the materials are unitarily managed by the distributing terminal. However, in this system, since a revision to the original material is separately performed in each of the distributing terminal and the receiving terminals, there is a problem in that inconsistency may occur between the revised materials of the distributing terminal and the received terminals after the video conference is ended. For example, the inconsistency may occur when one terminal adds information to a particular part of the original material and another terminal deletes at the same time the particular part of the original material.

Japanese Laid-Open Patent Application No. 5-56425 discloses a video conference system which improves the file managing method disclosed in the above-mentioned Japanese Laid-Open Patent Application No. 2-230437. In this system, the adding or correcting operation is processed in real time. That is, when a revising operation is performed in the receiving terminals, information displayed on screens of the receiving terminals is changed only after the revision information is sent to the distributing terminal and an answer is received back from the distributing terminal. In this system, there is a problem in that a response time from a revising operation to an actual change of the display becomes long.

Japanese Laid-Open Patent Application No. 61-9073 discloses a video conference system in which members joining the conference are assembled in one place. A large display screen is provided to be shared by each of the members. Additionally, a plurality of small display screens are provided close to the members. Each of the members can perform an adding or deleting operation by using the small display screen. This system uses the previously mentioned control right to perform an adding or deleting operation, and thus there is a problem in that transfer of the control right is troublesome and inconvenient when the discussion becomes excited.

SUMMARY OF THE INVENTION

It is a general object of the present invention to provide an improved and useful telewriting system in which the above-mentioned problems are eliminated.

A more specific object of the present invention is to provide a telewriting system having telewriting terminals each of which performs an adding or deleting operation to change an image displayed on display units of remote telewriting terminals without using a control right.

Another object of the present invention is to provide a telewriting system having telewriting terminals which change information freely from each telewriting terminal by performing a correction in accordance with differential information between information before a change and information after the change.

Another object of the present invention is to provide a telewriting system having telewriting terminals which store image information other than the image information corresponding to the image currently displayed on the display unit so as to switch the image displayed on the display unit.

In order to achieve the above-mentioned objects, there is provided according to one aspect of the present invention a telewriting system having a plurality of telewriting terminals connected with a communication line, each of the telewriting terminals having a display unit so as to display an image thereon, the image displayed on the display unit being changed in accordance with instruction information transmitted via the communication line, the telewriting system having a server unit connected to each of the telewriting terminals by the communication line, the server unit comprising:

communication means for communicating the instruction information and image information with each of the telewriting terminals via the communication line;

an image memory storing image information corresponding to an image displayed on the display unit of each of the telewriting terminals;

change means for changing the image information to be stored in the image memory, when the instruction information requesting a change of the image is received from the telewriting terminals, in accordance with the received instruction information;

differential information extraction means for extracting differential information between the image information before the change and the image information after the change; and distribution means for distributing the differential information to each of the telewriting terminals.

According to the above-mentioned invention, since the server unit is interposed between a plurality of telewriting terminals and the differential information is distributed to each of the telewriting terminals from the server unit, the same change is performed on the image information displayed on the display unit of each of the telewriting terminals. Thus, there is no difference between the contents of the image displayed on each of the telewriting terminals.

In one embodiment of the present invention, the image information comprises binary image data having a first value representing white and a second value representing black. The differential information extraction means comprises first extraction means and second extraction means. The first extraction means extracts the binary image data changed from the first value to the second value to obtain first differential information. The second extraction means extracts the binary image data changed from the second value to the first value to obtain second differential information. The first differential data is distributed separately from the second differential information.

Since the differential information may comprise the change of binary image data between white data "0" and black data "1" which are extracted from the image information before the change and the image information after the change, each of the telewriting terminals can update the displayed image simply by a logical sum or a logical multiplication with the differential information. This differential information is sufficient to be transmitted in a short time by facsimile communication. Thus, each of the telewriting terminals can freely change the displayed image without transferring a control right. The contents of change in the image information can be reflected to a plurality of telewriting terminals by a simple operation and in a short period of time.

Additionally, each of said telewriting terminals may be provided with display control means for displaying the image which is being changed through the display unit thereof. Thus, the changing operation can be performed while checking the changed image information.

In one embodiment of the present invention, each of the telewriting terminals comprises transmission request input means for inputting transmission request information for requesting transmission of the image information of the image displayed on the display unit of a remote telewriting terminal. The server unit comprises lump transmission means for transmitting the whole image information stored in the image memory to at least one of the telewriting terminals when the transmission request information is received from the at least one of the telewriting terminals. Thus, the image information displayed on the one of the telewriting terminals can be changed to the common image information shared by all other telewriting terminals when the image information of the one of the telewriting terminals is different from the image information of other telewriting terminals due to, for example, a communication error.

In one embodiment of the present invention, each of the telewriting terminals comprises switch request input means for inputting switch request information for requesting switching of the image displayed on the display unit. The telewriting system further comprises: a memory unit storing the image information to be displayed on the display unit of each of the telewriting terminals; and switch control means for switching a first image being displayed on the display unit to a second image, a switching operation being performed after the image information corresponding to the first image is stored in the memory unit, the image information corresponding to the second image being retrieved from the memory unit.

The memory unit and the switch control means may be provided in the server unit.

Additionally, the image information stored in the memory unit may be related to display instruction information including a reference number designating each image information. The switch control means switches the image displayed on the display unit by retrieving the image information from the memory unit by referring to the display instruction information.

According to this invention, the image information displayed on the display unit can be stored in the memory unit by relating the information including a document number to the image information. When the display instruction information including the document number is input, the image information being displayed on the display unit is stored in the memory unit. The requested image information is retrieved from the memory unit, and the image being displayed on the display unit is switched to the image corresponding to the retrieved image information. Thus, the image information sent from each telewriting terminals can be reliably retained. If a change has been made to the displayed image, the image displayed on the display unit is switched according to the request after the image information corresponding to the changed image was stored. Thus, it is not necessary to distribute the image information each time the image on the display unit is switched by storing a plurality of sets of image information, resulting in elimination of complex and inconvenient operations. Additionally, a telewriting operation can be performed on different images without losing the changed image on the display unit. The switching operation of the displayed image is easily and reliably performed due to the document number related to the image information. There is no inconsistency between the displayed images of the telewriting terminals.

Additionally, the switch control unit may interrupt a switching operation performed in accordance with the switch request information when the instruction information is received from one of the telewriting terminals. Thus, there is no inconsistency between the displayed images of the telewriting terminals. Additionally, the switching of the displayed image can be performed without losing the changed image.

In one embodiment of the present invention, the distribution means distributes the differential information in accordance with a receiving order of the instruction information so that the differential information corresponding to the instruction information received first is distributed first.

According to another aspect of the present invention, there is provided a telewriting system having a plurality of telewriting terminals connected with a communication line, each of the telewriting terminals having a display unit so as to display an image thereon, the image displayed on the display unit being changed in accordance with instruction information transmitted via the communication line, each of the telewriting terminals comprising: communication means for communicating the instruction information and image information with each of the telewriting terminals via the communication line; and change means for changing the image information corresponding to the image displayed on the display unit when the instruction information requesting a change of the image is received, the instruction information including differential information between the image information before the change and the image information after the change.

In the above-mentioned invention, the image information may comprise binary image data having a first value representing white and a second value representing black, the differential information including first differential information obtained by extracting the binary image data changed from the first value to the second value and second differential information obtained by extracting the binary image data changed from the second value to the first value. The change means comprises: discrimination means for discriminating the differential information to be one of the first differential information and the second differential information; and process means for processing the image information in accordance with a result of discrimination made by the discrimination means, a logical sum being performed on the image information with the differential information when the differential information is discriminated as the first differential information, a logical multiplication being performed on the image information with the differential information when the differential information is discriminated as the second differential information.

Other objects features and advantages of the present invention will become more apparent from the following detailed description when read in conjunction with the accompanying drawings.

BRIEF DESCRIPTION OF THE DRAWINGS

FIGS. 15A to 15D are illustrations for explaining data formats of information when the image information is transmitted;

FIGS. 17 and 18 are parts of a flowchart of an operation for receiving an instruction for displaying image information;

FIG. 19 is a flowchart of an operation for receiving an instruction for displaying image information; and FIGS. 20A to 20D are illustrations for explaining data formats of information when the displayed image is switched.

DETAILED DESCRIPTION OF THE PREFERRED EMBODIMENTS

Figure 1:
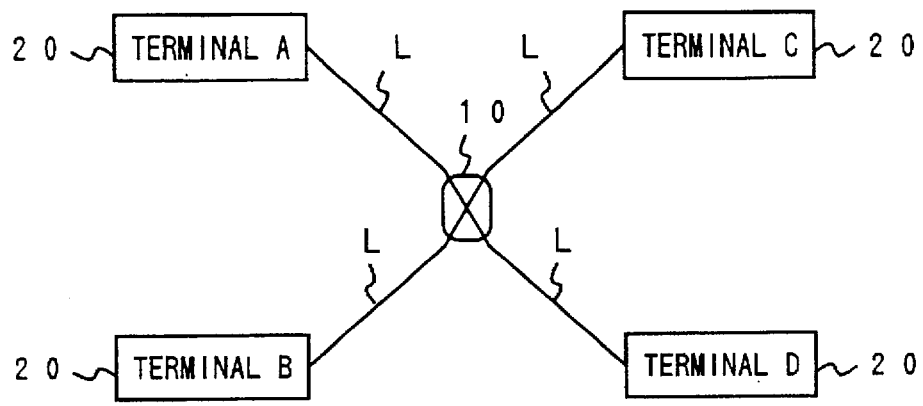
FIG. 1 is an illustration of a telewriting system according to a first embodiment of the present invention.

A description will now be given, with reference to FIGS. 1 to 5, of a first embodiment of the present invention. FIG. 1 is an illustration of a telewriting system according to the first embodiment of the present invention. In the telewriting system shown in FIG. 1, a meeting controlling unit (MCU) which is in accordance with the CCITT Recommendation H231 is provided to a server unit. Thus, the telewriting system shown in FIG. 1 constitutes a video conference system in which video communication or multi-media communication can be performed in accordance with the CCITT Recommendation H221 between each of the terminals.

In FIG. 1, each of terminals 20 (terminals A to D), which are client units, is connected to a server unit 10 via a communication line L. A communication line is established between the server unit 10 and each of the client units 20 when a telewriting operation is performed. The communication line L may be an ISDN line, a public telephone line or an exclusive communication line.

Figure 2:
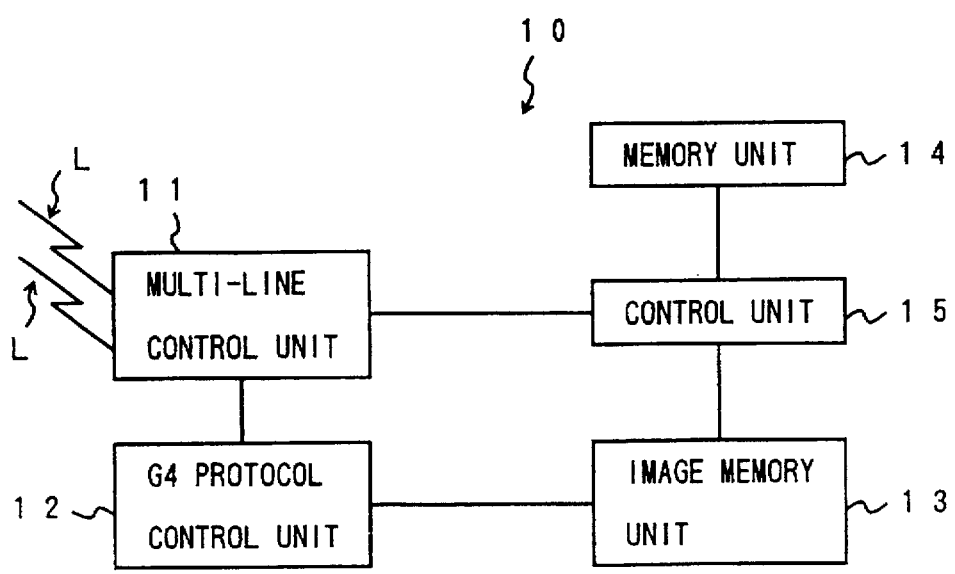
FIG. 2 is a block diagram of a server unit shown in FIG. 1.

The server unit 10 comprises, as shown in FIG. 2, a multi-line control unit (connection means) 11, a G4 protocol control unit (communication means) 12, an image memory unit (storing means) 13, a memory unit 14 and a control unit 15. The multi-line control unit 11 performs an interface between the server unit 10 and a plurality of lines L so as to control a connection between the server unit 10 and each of the client units 20. The G4 protocol control unit 12 controls transmission and reception of image information in accordance with the G4 facsimile communication protocol, and encodes and decodes the image information. The image memory unit 13 comprises a plurality of memories which store the image information. The memory unit 14 stores information including program information for achieving the present invention in the server unit 10. The control unit 15 controls each part of the system in accordance with the program stored in the memory unit 14.

Figure 3:
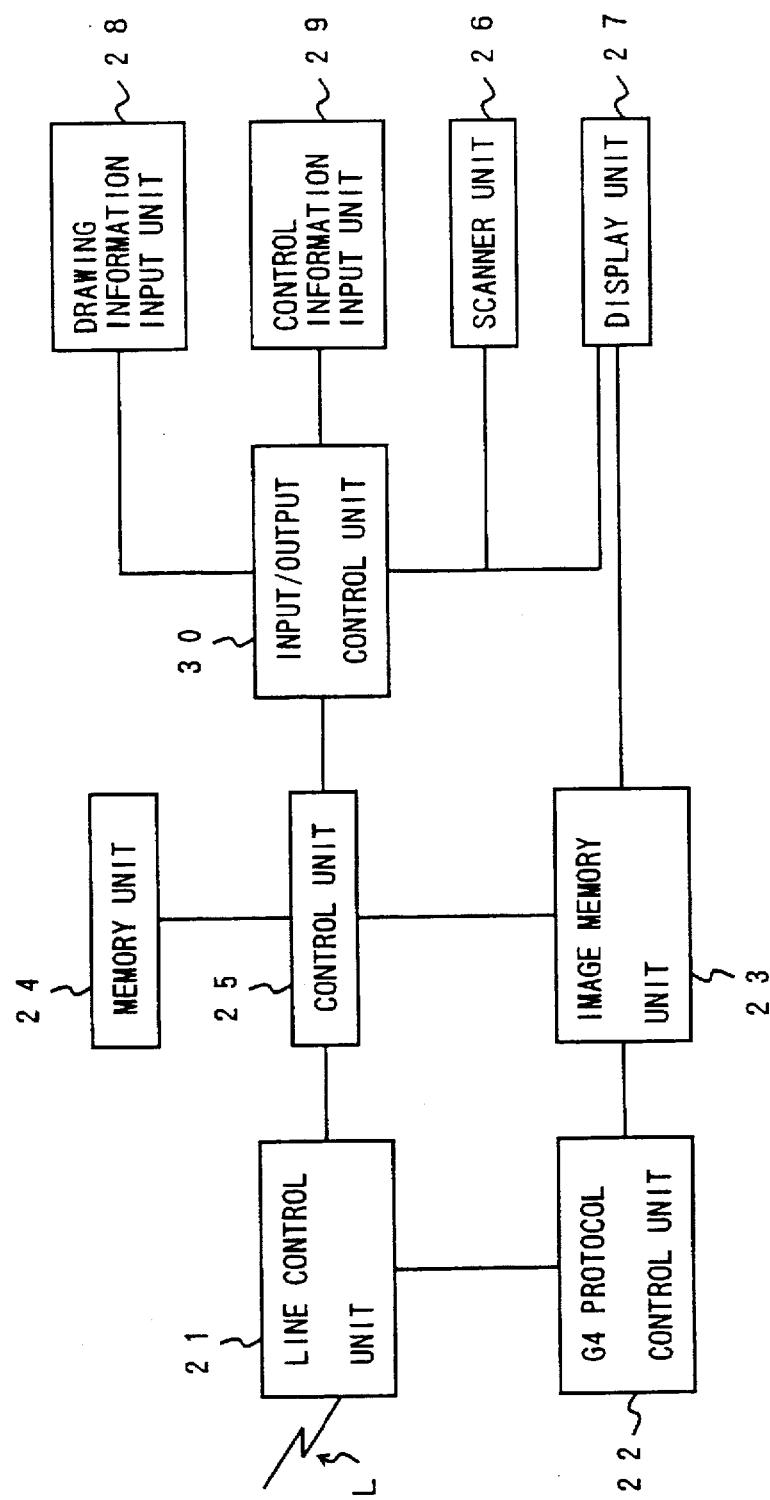
FIG. 3 is a block diagram of a client unit shown in FIG. 1.
Figure 4:
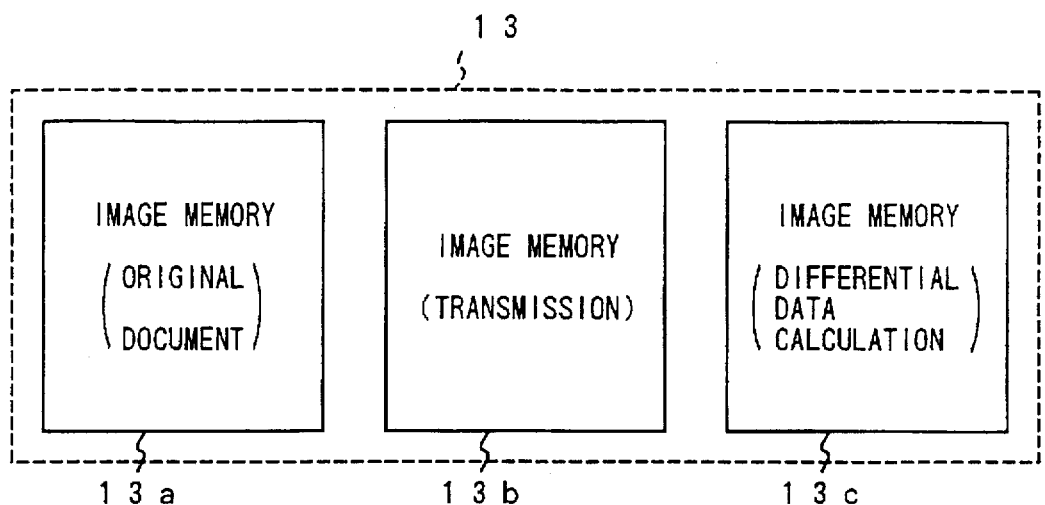
FIG. 4 is an illustration for explaining a structure of an image memory shown in FIG. 2.
Figure 5:
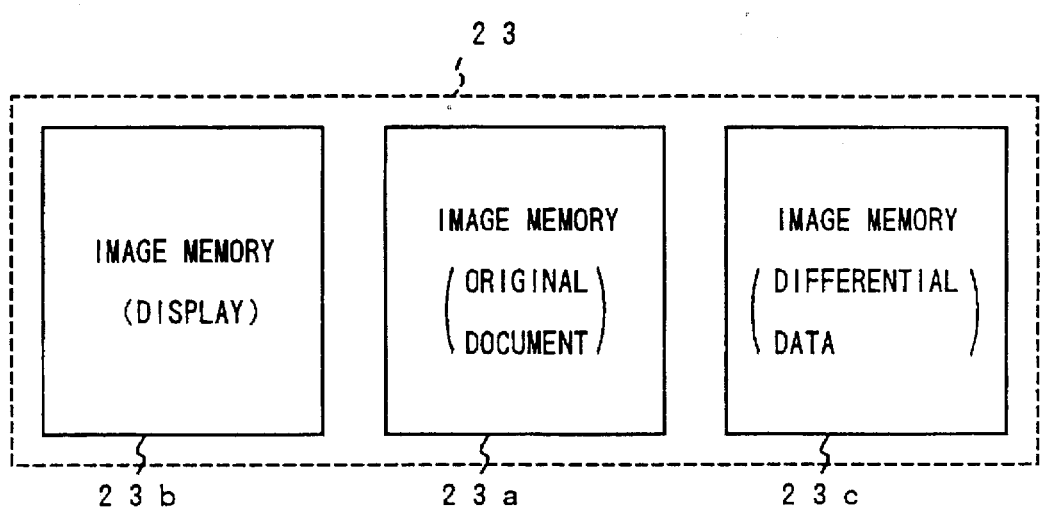
FIG. 5 is an illustration for explaining a structure of an image memory shown in FIG. 3.
Figure 6:
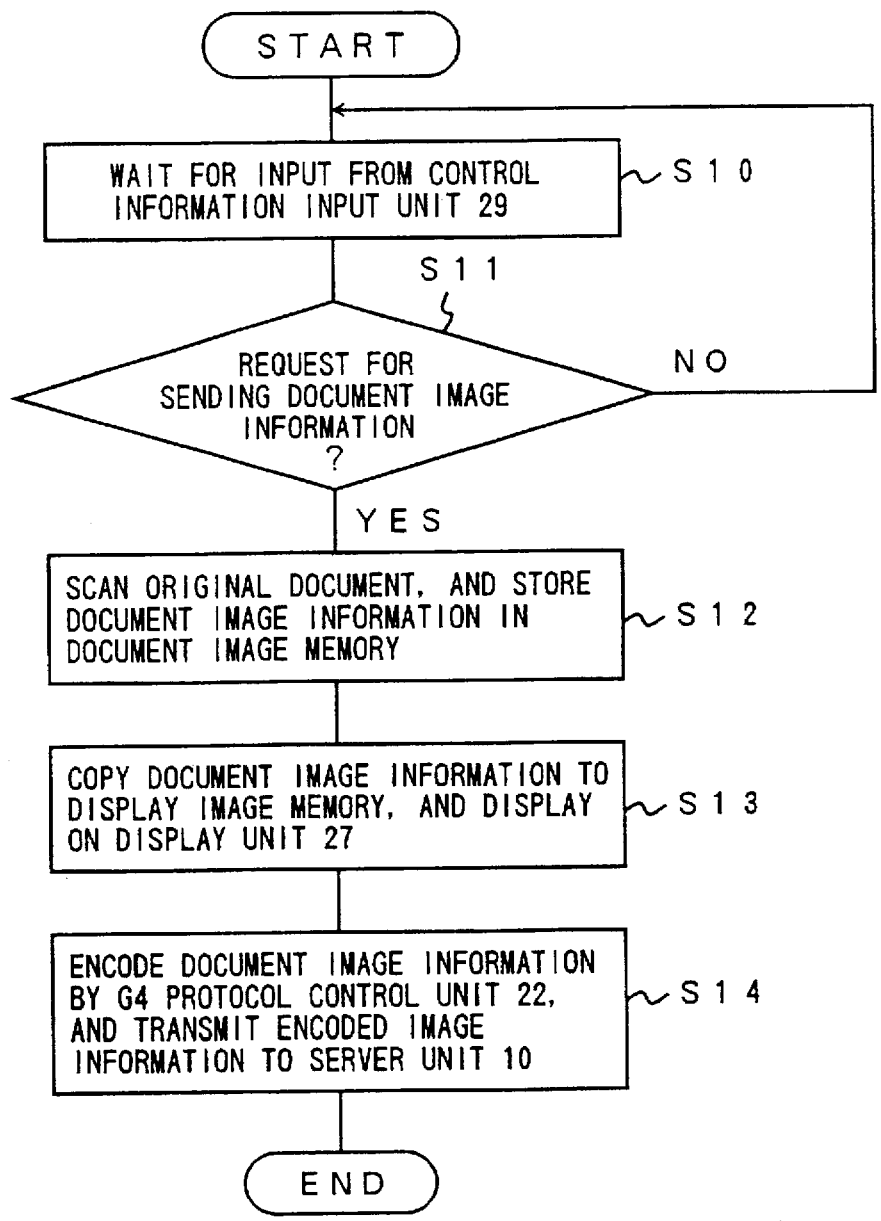
FIG. 6 is a flowchart of an operation for sending document image information performed in the client unit shown in FIG. 1.

Similarly to the server unit 10, each of the client units 20 comprises, as shown in FIG. 3, a line control unit 21, a G4 protocol control unit 22, an image memory unit 23, a memory unit 24 and a control unit 25. Additionally, each of the client units 20 comprises a scanner unit 26, a display unit 27, a drawing information input unit 28, a control information input unit (input means) 29 and an input/output control unit 30. The scanner unit 26 scans an original document so as to obtain image information. The display unit 27 displays the image information or control information stored in the image memory unit 23. The drawing information input unit 27 inputs drawing information (correction instruction information) by having an input device such as a touch pen. An addition or deletion of the contents of the image information displayed on the display unit 27 is performed according to the drawing information generated by the input device. The control information input unit 29 inputs control information necessary for performing the telewriting operation. The input/output control unit 30 controls an input and output operation of the drawing information and the control information for each of the units 26 to 29. It should be noted that the image memory unit 13 of the server unit 10 comprises, as shown in FIG. 4, an image memory 13a for storing the image information corresponding to the original document, an image memory 13b for storing image information which is to be transmitted and an image memory 13c for storing image information used for calculating differential data. The image memory unit 23 of each of the client units 20 comprises, as shown in FIG. 5, an image memory 23a for storing image information corresponding to the original document, an image memory 23b for storing image information which is displayed on the display unit 27 and an image memory 23c for storing the differential data.

The control unit 15 of the server unit 10 stores image information of an original document sent from one of the client units 20 (for example, terminal A) in the image memory unit 13. Thereafter the image information is distributed to other client units 20 (terminals B, C, D). When the server unit 10 receives drawing information from one of the client units 20, which drawing information indicates an addition or deletion of image information currently displayed on the display unit 27, the server unit 10 changes the image information stored in the image memory unit 13 in accordance with the received drawing information. Thereafter, the server unit 10 extracts differential data which represents the difference between the image information before a change and the image information after the change. The differential data is then distributed to each of client units 20. When the server unit 10 receives the drawing information from a plurality of client units 20, the drawing information is sequentially processed in accordance with the received order. If the image information (display information) displayed on the display unit 27 is based on binary image information, first binary image information which has been changed from "0" to "1" is extracted first as the differential information. Then, second binary image information which has been changed from "1" to "0" is extracted. The extracted first and second binary image information is separately distributed as the differential information. That is, the control unit 15 constitutes correction means and differential data extract means having first and second extract means and distribution means.

The control unit 25 of each client unit 20 updates the display information stored in the image memory unit 23 in accordance with the differential information when the differential information is received from the server unit 10. If it is determined that the differential information corresponds to the first binary image information which represents the change from "0" to "1", the image information in the image memory unit 23 is changed by performing a logical sum with the first binary image information. If the differential information corresponds to the second binary image information which represents the change from "1" to "0", the image information in the image memory unit 23 is changed by performing a logical multiplication with the second binary image information. That is, the control unit 25 constitutes discrimination means and change means having change operation means.

In the above-mentioned operation, the server unit 10 and each of the client units 20 transmit and receive, by means of the G4 facsimile communication, the image information corresponding to the original document to be displayed on the display unit 27 and the image information (the differential information) extracted from the image information before a change and the image information after the change. On the other hand, the drawing information (telewriting information) for changing the display information displayed on the display unit 27 is transmitted and received by means of the telewriting communication.

Additionally, the control unit 15 of the server unit 10 sends the updated image information in the memory unit 13 to at least the client unit 20 (for example, terminal A) when a request for sending the image information to other client units 20 (terminals A, B, C) is received. That is, the control unit 15 constitutes lump transmission means. On the other hand, the control unit 25 of each client unit 20 displays the image information stored in the image memory unit 23 on the display unit 27 after the change of the image information is completed when the correction is performed by the drawing information input unit 28. That is, the control unit 25 constitutes display control means.

A detailed description will now be given of the information transmitted between the server unit 10 and each of the client units 20.

The G4 facsimile communication and the telewriting communication are performed between the server unit 10 and each of the client units 20. In order to simultaneously perform a plurality of communications with a single communication line (the line L), the recommendation Q922 (LAPF) standardized by ITU is used. Announcement information indicating the need for performing the G4 facsimile communication may be transmitted by adding the announcement information to information transmitted by the telewriting communication. In this case, the unit which received the announcement information switches to the G4 facsimile communication waiting mode. After the G4 facsimile communication is completed, the unit is returned to the telewriting communication mode. That is, the unit is normally set in the telewriting communication mode, and is switched to the G4 facsimile communication mode when the announcement information for requesting the G4 facsimile communication mode is received.

An operation performed by the receiver is different between the image information corresponding to the original document and the image information corresponding to the differential information transmitted and received by means of the G4 facsimile communication. Thus, it is necessary to determine which information has been received. Additionally, the differential information includes the first binary image information and the second binary image information.

Accordingly, the type of the image information may be determined by the encoded data according to the G4 facsimile communication Recommendation T.62. For example, the document type identifier included in the document start command (CDS) defined in by T.62 may be used. The optional function of T.62 which uses cession user data may be utilized. As an alternative, control information including the type of information may be sent when the information for requesting the G4 facsimile communication is transmitted by the telewriting communication.

A description will now be given, with reference to FIGS. 6 to 10, of an operation performed by the first embodiment.

In this embodiment, each client unit 20 calls the server unit 10 by following the procedure defined by the CCITT Recommendation H.243 so as to establish the multi-point connection between the server unit 10 and the client units 20. The telewriting communication can be performed by establishing the communication channel by the protocol according to the Low-Speed Data (LSD) information or Multilayer Protocol (MLP) information. A description will now be given of a case in which a telewriting is performed when binary image information of the original document is commonly possessed by each of the client units 20 (the terminals A to D). It should be noted that steps S10 to S24 are not necessary when the telewriting is performed without an original document, that is, when the telewriting is started from a blank state. <<transmission of image information of the original document from client unit 20: refer to FIG. 6>>

When the operation for transmitting the information of the original document is started, the client unit 20 (for example, the terminal A) waits for an input from the control information input unit 29 in step S10. When the input for requesting distribution of the original document is confirmed in step S11, the routine proceeds to step S12. In step S12, the original document set in the terminal A is scanned by the scanner unit 26, and the image information (hereinafter referred to as document image information) of the original document is sent to the image memory unit 23. The document image information is stored in the image memory 23a (hereinafter referred to as a document image memory) which is for storing the document image information. Then, in step S13, the document image information is copied to the image memory 23b (hereinafter referred to as a display image memory), and the document image information stored in the display image memory 23b is displayed on the display unit 27. Thus, in the terminal A, the document image information obtained by scanning the original document by the scanner unit 26 is displayed on the display unit 27.

Figure 7:
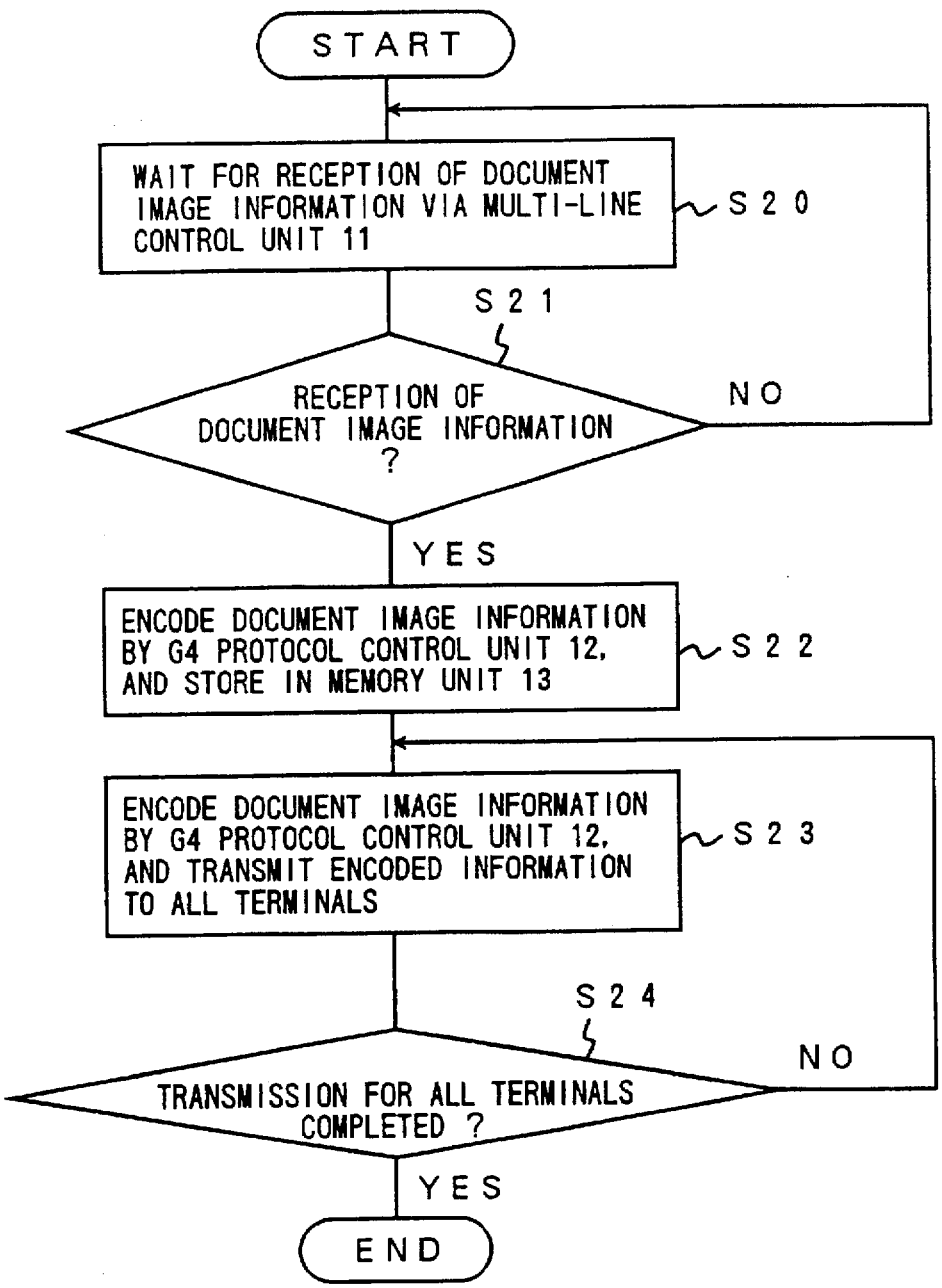
FIG. 7 is a flowchart of an operation for receiving document image information performed in the server unit shown in FIG. 1.

Thereafter, in step S14, the document image information is encoded by the G4 protocol control unit 22, and transmitted to the server unit 10 via the line control unit 21 in accordance with the G4 facsimile communication protocol. <<reception of document image information by the server unit 10: refer to FIG. 7>>When an operation for receiving the document image information is started, the server unit 10 waits for reception of the document image information in step S20. When the reception of the document image information is confirmed in step S21, the routine proceeds to step S22. In step S22, the received document image information is decoded by the G4 protocol control unit 12, and is stored in the image memory 13a (hereinafter referred to as a document image memory) of the image memory unit 13. The document image information stored in the document image memory 13a is copied to the image memory 13b (hereinafter referred to as a transmission image memory) for storing the image information to be transmitted. Thereafter, in step 23, the received document image information is encoded by the G4 protocol control unit 12. The encoded document image information is distributed to other client units 20 (the terminals B, C, D) via the multi-line control unit 11 in accordance with the G4 facsimile communication protocol. It is then determined, in step S24, whether or not the document image information is sent to all of the client units 20 (the terminals B, C, D). If it is determined that the document image information is sent all client units 20 other than the terminal A, the routine is ended. Otherwise, the routine returns to step S23 to repeat steps S23 and S24. According to the above-mentioned operation, the document image information obtained by the terminal A is shared with the terminals B, C and D. Additionally, the document image information is stored in the document image memory 23a and display image memory 23b of the memory unit 23 of each of the terminals B, C and D. The same document image information is displayed on the display unit 27 of each of the client units 20 (the terminals A to D). <<input of the drawing information (change instruction) from the client unit 20: refer to FIG. 8>>

When an operation for inputting the drawing information is started in the client unit 20, the control information input unit 29 sets the client unit 20, in step S30, in an instruction mode in which a writing operation such as a free drawing or a deletion can be performed. Then, the drawing information is input, in step S31, from the drawing information input unit 29. The drawing information includes position (coordinate position) information of parts to be changed. The image information stored in the display memory 23b is updated in step S32. As the image information in the display memory 23b is updated, the updated image information is always displayed on the display unit 27 in real time. Thus, the changing operation can be performed while checking the changed image displayed on the display unit 27.

Figure 9:
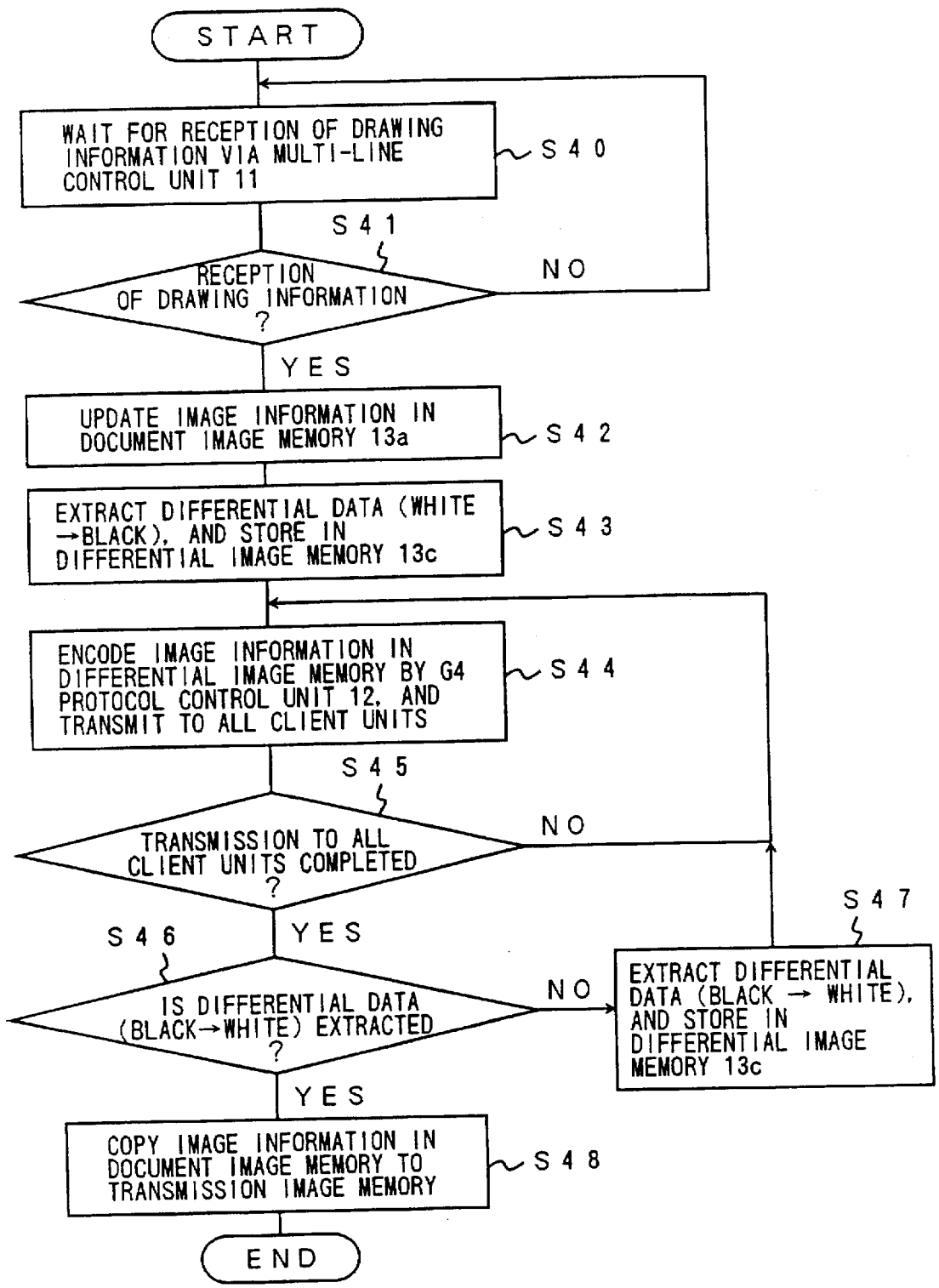
FIG. 9 is a flowchart of an operation for receiving a change instruction performed in the server unit shown in FIG. 1.

Thereafter, when the instruction for change is input from the control information input unit 29, the drawing information is transmitted, in step S33, to the server unit 10 via the line control unit 21 as telewriting information. <<reception of the drawing information (change instruction) by the server unit 10: refer to FIG. 9>>

When an operation for receiving the drawing information is started, the server unit 10 waits for the reception of the drawing information via the multi-line control unit 11 in step S40. When the reception of the drawing information is confirmed in step S41, the routine proceeds to step S42. In step S42, the image information in the document image memory 13a is updated similarly to the operation performed in the client unit 20. Then, the data (first data) changed from white data represented by "0" to black data represented by "1" is extracted. The extracted first data is stored, in step S43, in the image memory 13c (hereinafter referred to as a differential image memory) for storing the differential data. The image information "c" stored in the differential image memory 13c corresponds to the differential information for each line. The image information "c" for each scan line is calculated by the following expression (1).

$$(a \text{ XOR } b) \text{ AND } a = c \tag{1}$$

Where "a" is the image information stored in the document image memory 13a;

"b" is the image information stored in the transmission image memory 13b.

The extracted (calculated) differential data (differential information) stored in the differential image memory 13c is encoded, in step S44, by the G4 protocol control unit 12, and then distributed to each of the client units 20. It is determined, in step S45, whether or not the differential data is transmitted to all client units 20. If it is determined that the differential data is transmitted to all client units 20, the routine proceeds to step S46. Otherwise, the routine returns to step S45 so as to repeat steps S45 and S46.

In step S46, it is determined whether or not the data (second data) changed from black data represented by "1" to white data represented by "0" is extracted. If it is determined that the second data has not been extracted, the routine proceeds to step S47. In step S47, the second data is extracted for each scan line by the following expression (2) similarly to the operation for extracting the first data.

$$(a \text{ XOR } b) \text{ AND } b=c \quad (2)$$

Thereafter, the routine returns to step S44 so as to distribute the second data to all client units 20. Then, the image information in the document image memory 13a is copied, in step S48, to the transmission image memory 13b so as to prepared for the next differential data extracting operation.

Figure 10:
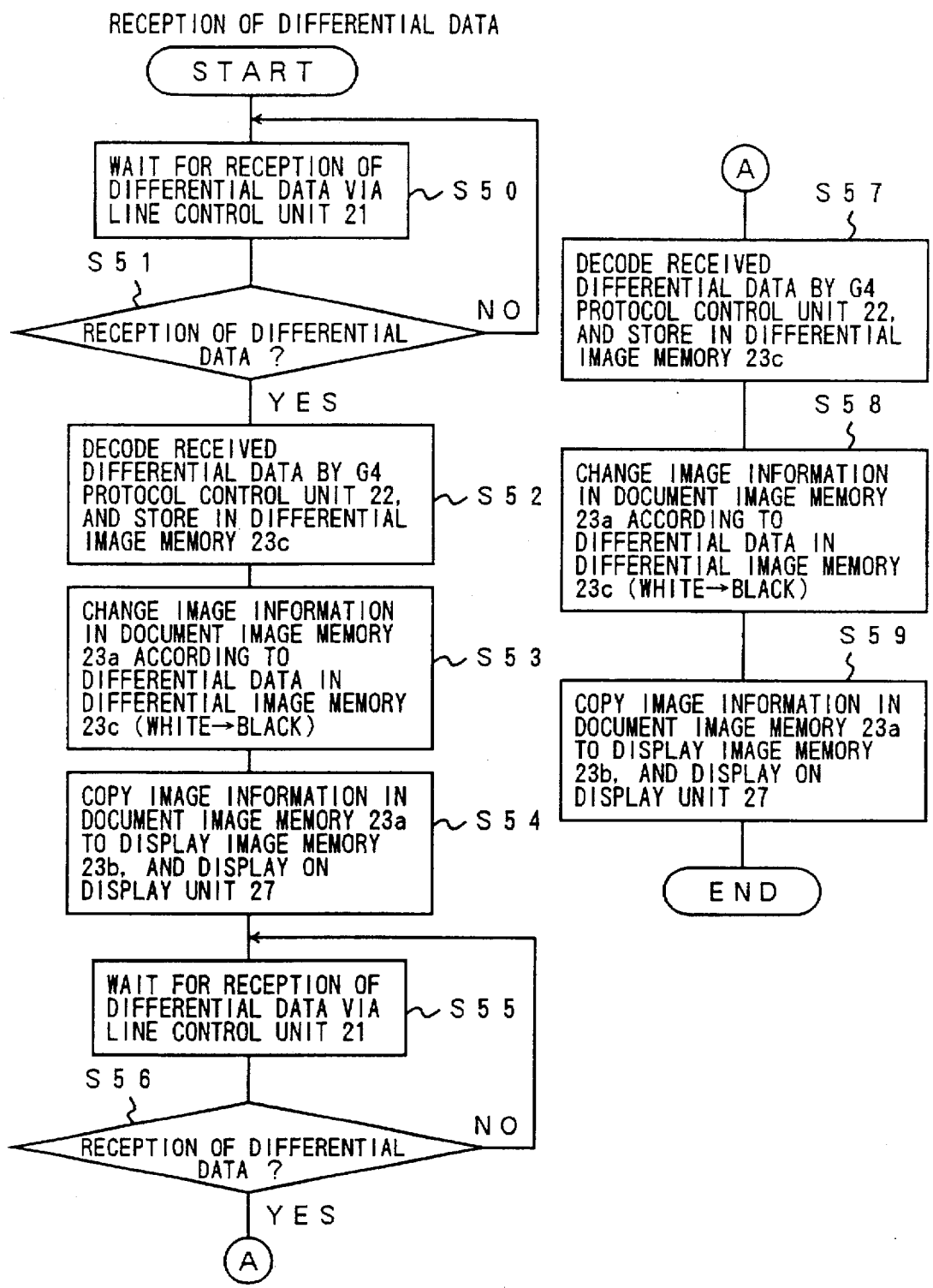
FIG. 10 is a flowchart of an operation for receiving differential information performed in the client unit shown in FIG. 1.

It should be noted that when neither the first data nor the second data is extracted, the differential data having no change is generated. <<reception of the differential data by the client unit 20: refer to FIG. 10>>

When an operation for receiving the differential data is started, the client unit 20 waits for the reception of the differential data via the line control unit 21 in step S50. When the reception of the differential data is confirmed in step S52, the routine proceeds to step S52. In step S51, the received differential data is decoded by the G4 protocol control unit 22. The decoded differential data is stored in the differential image memory 23c of the image memory unit 23. Thereafter, in step S53, the image information in the document image memory 23a is changed by a logical multiplication with the differential data stored in the differential image memory 23c in step S52. This is because the differential data stored in step S52 corresponds to the first data which is extracted for the data changing from white data "0" to black data "1". Accordingly, the change of the image information (displayed information change) corresponding to an addition designated by the drawing information is performed.

Thereafter, the image information in the document image memory 23a is copied to the display image memory 23b. Then, the image information stored in the display image memory 23b is displayed, in step S54, on the display unit 27.

Thereafter, the client unit 20 waits for the reception of the differential data via the line control unit 21 in step S55. When the reception of the differential data is confirmed in step S56, the routine proceeds to step S57. In step S57, the received differential data is decoded by the G4 protocol control unit 22. The decoded differential data is stored in the differential image memory 23c of the image memory unit 23. Thereafter, the differential data in the differential image memory 23c is inverted. Then, in step S58, the image information in the document image memory 23a is changed by a logical sum with the inverted differential data. This is because the differential data stored in step S57 corresponds to the second data which is extracted for the data changing from black data "1" to white data "0". Accordingly, the change of the image information (displayed information change) corresponding to a deletion designated by the drawing information is performed.

Thereafter, the image information in the document image memory 23a is copied to the display image memory 23b. Then, the image information stored in the display image memory 23b is displayed, in step S59, on the display unit 27.

It should be noted that when the differential data does not include a change of the image information, substantial image information change is not performed.

In the above-mentioned operation, the displayed image information is changed in the order of reception of the drawing information. Accordingly, the same change is applied to the image information displayed on the display unit 27 of each of the client units 20. Thus, there is not a difference between the contents of the displayed image information of each of the client units 20.

Additionally, the image information stored in the document image memory 13a of the image memory unit 13 of the server unit 10 is transferred to one of the client units 20 when the one of the client units 20 requests a transfer of the image information. This request is sent by the control information input unit 29 of the one of the client units 20. The image information in the document image memory 13a is sent to the one of the client units 20 via the multi-line control unit 11 in accordance with the G4 facsimile communication protocol. At this time, the image information may be sent to all of the client units 20. Accordingly, the current image information displayed on the display unit 27 can be freely corrected if the displayed image information is incomplete due to an abnormal communication condition so that the common image information can be always displayed on each of the client units 20.

In the present embodiment, since the server unit 10 is interposed between a plurality of client units 20 and the differential information is sequentially distributed to each of the client units 20 from the server unit 10, the same change is performed on the image information displayed on the display unit 27 of each of the client units 20. Thus, there is no difference between the contents of the image information displayed on each of the client units 20. Additionally, since the differential information comprises the change of binary data of white data "0" and black data "1"which is extracted from the image data before a change and the image data after the change, each of the client units 20 can update the displayed image information simply by a logical sum or a logical multiplication with the drawing information (differential data). This differential information is sufficient to be transmitted by a short time facsimile communication. Thus, each of the client units 20 can freely change the displayed image information without transferring a control right. The contents of change in the image information can be reflected to a plurality of client units by a simple operation and in a short period of time.

Additionally, since the client units 20 can display the image information being changed on their display unit 27, the changing operation can be performed while checking the changed image information.

Further, by sending from one of the client units 20 to the server unit 10 the request for lump transfer of the image information, the updated image information can be transferred to the one of the client units 20. Thus, the image information displayed on the one of the client units 20 can be changed to the common image information shared by all other client units when the image information of the one of the client units 20 is different from the image information of other client units 20 due to, for example, a communication error.

In a variation of the present embodiment, at least one buffer image memory may be added to the image memory unit 13. The image information in the document image memory 13a is copied to the buffer image memory before the extraction of the differential information and the transmission of the differential information are performed. The differential information in the buffer image memory is used for extracting and transmitting the differential information. According to this construction, the reception of the drawing information frequently sent from each of the client units 20 can be performed when the extraction and transmission of the differential data is being performed. Thus, the processing of the differential data can be continuously performed after the image information in the document image memory 13a is copied to the buffer image memory. This results in real-time telewriting operation. As an alternative, a plurality of document image memories 13a may be provided in the image memory unit 13. The same effect may be obtained if a large capacity memory is used as the document image memory 13a and is divided into a plurality of memory areas.

It should be noted that in the above-mentioned embodiment, although the differential information comprises the difference in the binary image data of the image information, a code corresponding to characters or a drawing may be used as the differential information. Additionally, the server unit 10 may distribute to each of the client units 20 the whole contents of the image information after change.

Figure 8:
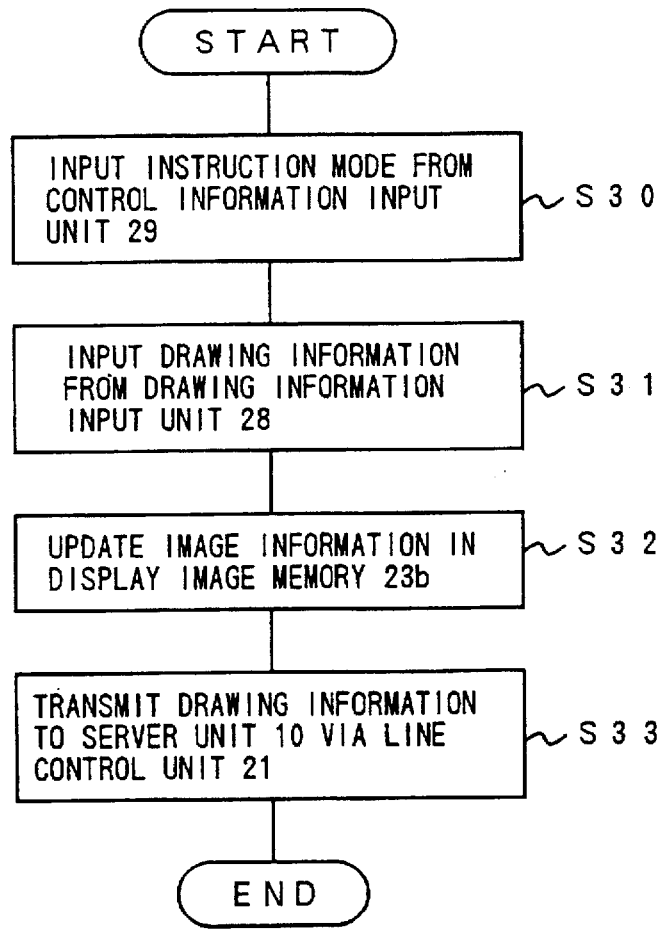
FIG. 8 is a flowchart of an operation for inputting a change instruction performed in the server unit shown in FIG. 1.

A description will now be given of a second embodiment of the present invention. The second embodiment uses substantially the same construction of the server unit 10 and the client units 20 of the first embodiment, and thus the description thereof will be omitted. Additionally, the operations shown in FIGS. 8 to 10 are also performed in the second embodiment.

A description will now be given, with reference to FIGS. 1 to 3, of a structure of the second embodiment. The memory unit 14 of the server unit 10 used in the second embodiment has a hard-disk apparatus as information storing means. The hard-disk apparatus stores the programs used for performing the operations according to the present invention. The hard-disk apparatus also stores each set of the image information sent from the client units 20 in the reception order. Each set of the image information is stored in the hard-disk apparatus as file information so that each set of the image information can be retrieved by referring to display designation information such as a document number. The document number is used when the displayed image information is switched. Additionally, the memory unit 14 stores page information together with the image information. The page information is provided for indicating specific pages included in one set of the image information, when the image information includes a plurality of pages, so that the image information corresponding to each page can be retrieved. The page information may be sent from the client units 20.

The memory unit 24 of each of the client units 20 is provided with information storing means for storing image information sent from the server unit 10 and the displayed image information by relating to the document number and the page information similarly to the memory unit 14 of the server unit 10.

The switching operation of the image information displayed on the display unit 27 of one of the client units 20 is controlled by the control unit 15 of the server unit 10 and the control unit 25 of the one of the client units 20. The switching operation is performed when a request for switching the displayed image information is input from the control information input unit 29 of the one of the client units 20. The image information is stored in the memory units 14 and 24. That is, in the present embodiment, the memory units 14 and 24 of the server unit 10 and the client units 24 together constitute retain means, and the control units 15 and 25 of the server unit 10 and the client unit 20 together constitute switch control means.

Additionally, the control unit 15 of the server unit 10 interrupts the switching operation when two operations are requested at the same time. One of the requests may be for the operation performed when the drawing information (change instruction information) is received from one of the client units 20 (for example, the terminal A). The other request may be for the operation performed when the request for switching the displayed image information is received from another client unit 20 (for example, the terminal B). Accordingly, the change operation of the image information has a priority over the switching operation of the displayed image information. Thus the switching operation is performed after the changing operation of the image information is completed.

Figure 11:
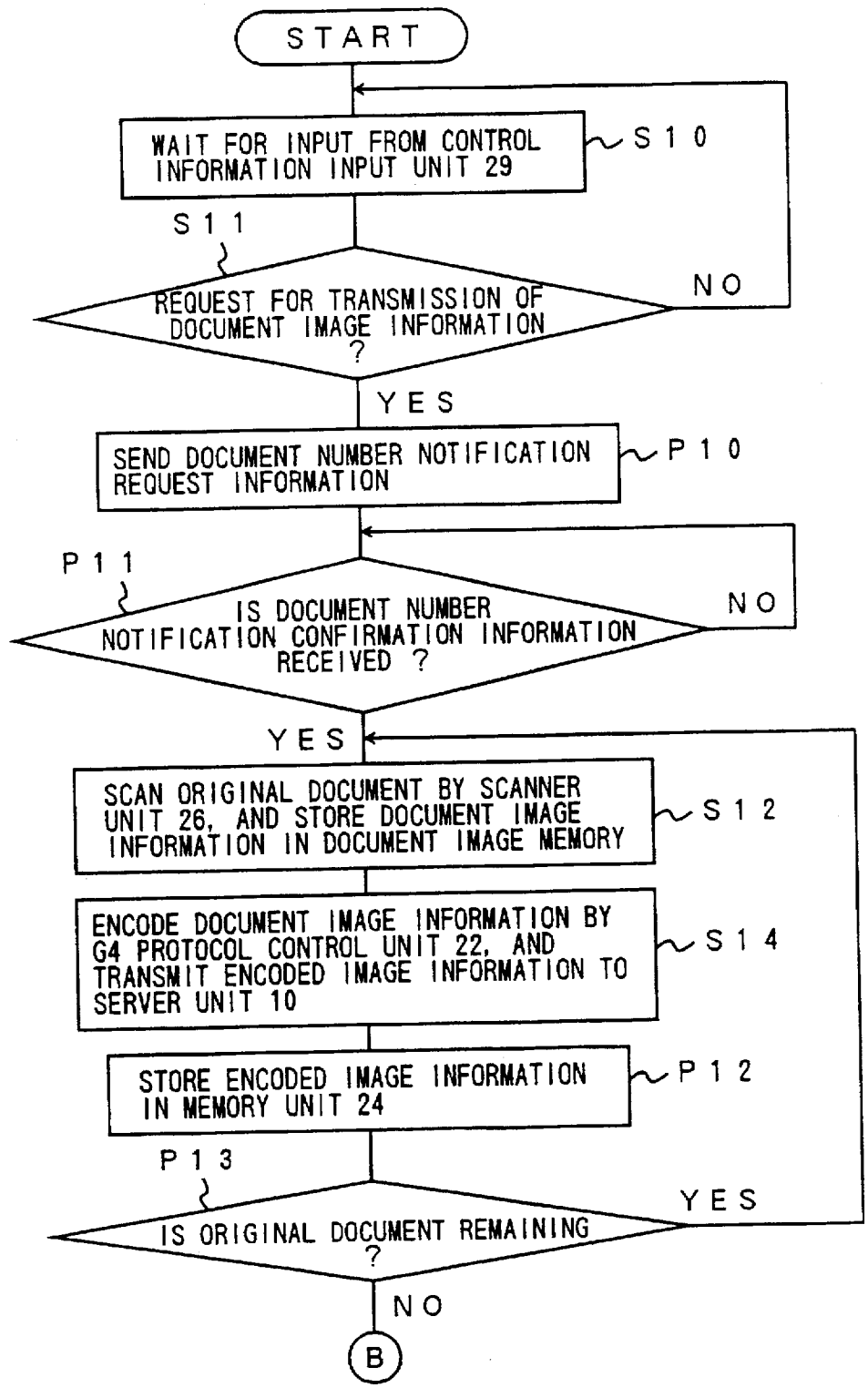
FIGS. 11 and 12 are parts of a flowchart of an operation for receiving document image information according to a second embodiment of the present invention.
Figure 12:
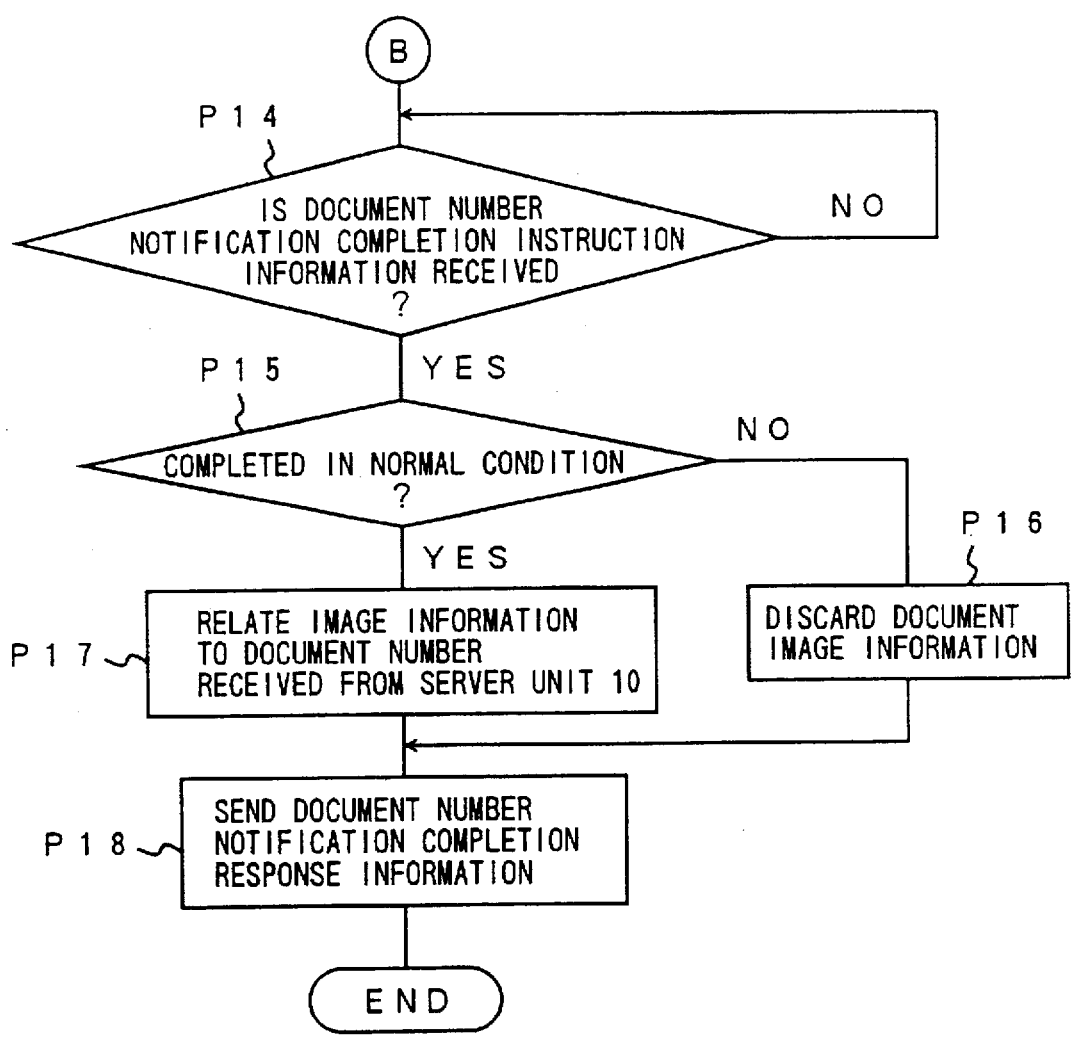
Figure 13:
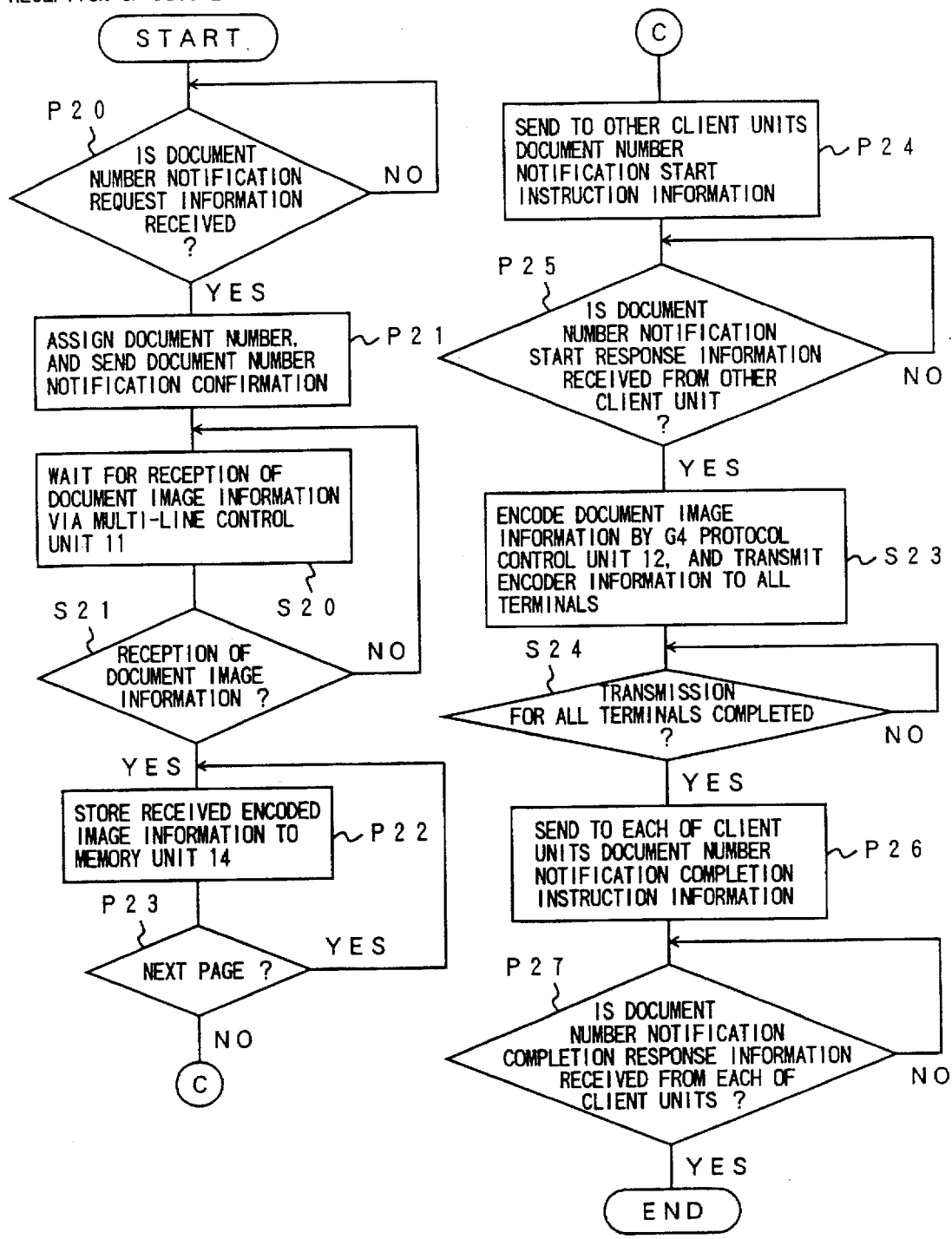
FIG. 13 is a flowchart of an operation for receiving document image information performed in a server unit of the second embodiment.
Figure 14:
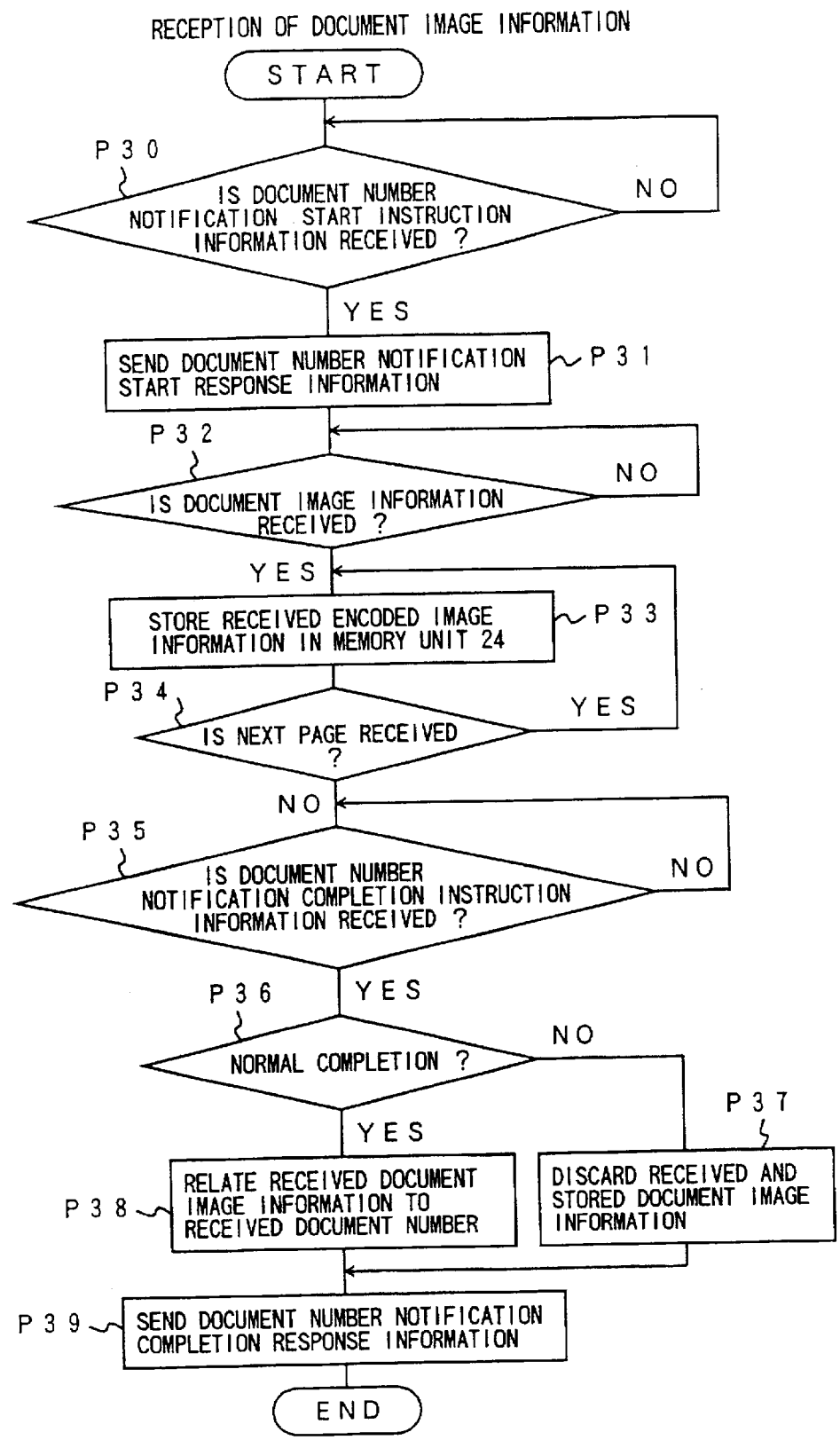
FIG. 14 is a flowchart of an operation for receiving document image information performed in a client unit of the second embodiment.

A description will now be given of an operation of the second embodiment according to the present invention. In the flowcharts shown in FIGS. 11 to 19, steps that are the same as the steps of the first embodiment are given the same step numbers, and descriptions thereof will be omitted
<<transmission of document image information from the client unit 20: refer to FIGS. 11 and 12>>

When the transmitting operation of the document image information of the original document is started, the client unit 20 waits for an input of a request for transmission of the document image information in step S10. When the input of the request for transmission of the document image information is confirmed, in step S11, by the control information input unit 29, the routine proceeds to step P10. In step P10, information for requesting notification of the document number (document number notification request information) is sent to the server unit 10 before performing step S12 in which the original document is scanned by the scanner unit 26. The document number notification request information includes, as shown in FIG. 15A, information for a type of command (request), a command code (notification of the document number), a document number (=0) and a name of the document (for example, a test document). This is to request to start an operation for assigning the document number to the image information to be displayed on the display unit 27. At this time, since the document number has not been assigned, the number is set to "0 (null)". It should be noted that FIGS. 15A to 15D show examples of the data format of information transmitted between the server unit 10 and the client units 20.

When information for confirming the receipt of the document number notification request information (document number notification confirmation information) is received, in step P10, from the server unit 10, the routine proceeds to step S12. The document number notification confirmation information includes, as shown in FIG. 15B, a type of command (confirmation) and the document number (N). After performing step S12, the routine proceeds to step S14 without performing step S13. After performing step S14, the routine proceeds to step P12. In step P12, the encoded document image information is stored in the memory unit 24. If information for instructing notification of the document number (document number notification instruction information) is received, in step P11, from the server unit 10, it is determined that an operation requested by other client units 20 is performed first, that is, the image information corresponding to the document number N included in the 'instruction information is stored first. In this case, a reception operation related to the instruction information is performed. In the present embodiment, since the image information is stored in the image memory unit 23 by the reception operation (described later), step S13 is not performed. However, step S13 may be performed at this time so as to store the image information and display the image information on the display unit 27.

It is then determined, in step P13, whether or not any part of the original document to be scanned remains. If any part of the original document to be scanned remains, the routine returns to step S12 so as to repeat step S12, S14 and P12 so as to store the image information together with the page information. If it is determined, in step P13, that no part of the original document remains, information for requesting completion of notification of the document number (document number notification completion request information) is sent from the client unit 20 to the server unit 10. If it is determined, in step P14 (shown in FIG. 12), that information for instructing completion of notification of the document number (document number notification completion instruction information) is received, the routine proceeds to step P15. It is determined, in step P15, whether or not the document number notification operation is completed in a normal condition. Information for determining the normal completion of the operation is included in the document number completion instruction information. If it is determined that the document number notification operation is not completed in a normal condition, the routine proceeds to step P16 in which the image information stored in the memory unit 24 is discarded. If it is determined, in step P15, that the document number notification operation is ended in a normal condition, the routine proceeds to P17. In step P17, the document number N received in step P11 is related to the image information stored in the memory unit 24. In step P18, information for responding to completion of notification of the document number (document number notification completion response information) shown in FIG. 15D is sent to the server unit 10, and the transmitting operation of the original document is ended. It should be noted that when it is determined, in step P15, that the document number notification operation is not completed in a normal condition, the routine may directly proceed to step P18 without performing step P16 so that the routine simply skips step P17.

In this embodiment, since the image information is transmitted in accordance with the G4 facsimile communication protocol, the routine may be ended without performing steps P14 to P18. This is applicable to the transmitting operation of the image information described later. However, if sets of image information, which are desired to be related to other document numbers, are consecutively transmitted, information indicating that matter is included in the document number notification completion response information sent in step P18 so as to notify the server unit 10 of that matter. In this case, the routine returns to step P10 to repeat the operation. <<reception of the document image information by the server unit 10: refer to FIG. 13>>

When it is determined, in step P20, that the document number notification request information is received from one of the client units 20 (for example, the terminal A), the server unit 10 assigns a new document number N to the image information to be stored in the memory unit 14. In step P21, the server unit 10 sends the document number notification confirmation information including the document number N to the client unit 20 (the terminal A).

Then, steps S20 and S21 are performed. Thereafter, if the document image information is received, the encoded document image information sent from the client unit 20 is stored, in step P22, in the memory unit 14 by relating with the document number N so that the stored document image information can be retrieved by referring to the document number N. As mentioned-above, the client unit 20 is notified of the document number N. It is then determined, in step P23, whether or not the image information corresponding to the next page of the original document is received. If the image information corresponding to the next page is received, the routine returns to step P22 to store the image information together with the page information. If it is determined that the image information corresponding to the next page is not received, the routine proceeds to step P24. In step P24, the document number notification start instruction information is sent to other client units 20 (the terminals B, C, D) so as to instruct them to relate the document number N to the image information which will be sent after the document number notification start instruction information. Thereafter, when it is determined, in step P25, that the document number notification completion response information shown in FIG. 15D is received from the client unit 20 (the terminal A), the steps S23 and S24 are performed so that the image information stored in the memory unit 14 is distributed sequentially to other client units 20 (the terminals B, C, D).

After the distribution of the image information is completed, the server unit 10 sends, in step P26, to each of the client units 20 the document number notification completion instruction information which instructs completion of the document number notification operation. If the operation has been completed in a normal condition, the normal completion information is included in the document number notification completion instruction information. It is then determined, in step P27, whether or not the document number notification completion response information is received from each of the client units 20. If affirmative, the routine is ended. It should be noted that the normal completion information cannot be included in the document number notification completion instruction information sent in step P26, that is, if an error has occurred in the transmission of the image information, the image information stored in the memory unit 14 is discarded. In this case, the operation for transmitting the image information is performed again. Additionally, the fact that an error has occurred in the transmission may be displayed on the display unit 27.

In this embodiment, the image information is sent to the client units 20 (the terminals B, C, D) after the image information received from the client unit 20 (terminal A) is stored in the memory unit 14. In order to reduce the process time, the distribution of the image information to the client units 20 (the terminals B, C, D) may be started immediately after step P21 is performed or after the image information corresponding to a few pages of the original document has been received. Use of such simultaneously performed operations may be dependent on the processing capability of a central processing unit (CPU) provided in the control unit 15 of the server unit 10. <<reception of document image information by the client unit 20: refer to FIG. 14>>

When the client units 20 (terminals B, C, D) receive, in step P30, the document number notification instruction information from the server unit 10, the client units 20 send to the server unit 10 the document number notification response information shown in FIG. 15D including the type (response) of command in step P31. It is determined, in step P32, whether or not the image information is received from the server unit 10. If it is determined that the image information is received, the encoded image information sent from the server unit is stored, in step P33, in the memory unit 24. Then, it is determined, in step P34, whether the image information corresponding to the next page of the original document is received. If it is determined, in step P34, that the image information corresponding to the next page is not received, and if it is determined, in step P35, that the document number notification completion instruction information is received from the server unit 10, the routine proceed to step P36. In step P36, it is determined whether or not the normal completion information is included in the received document number notification completion instruction information. If it is determined, in step P36, that the operation is not completed in a normal condition, the routine proceeds to P37 to discard the image information stored in the memory unit 24. If it is determined that the operation is completed in a normal condition, the routine proceeds to step P38. In step P38, the image information is related to the document number N which is sent from the server unit 10. Then, in step P39, the document number notification completion response information is sent to the server unit 10, and the reception of the document image information is ended.

Accordingly, the server unit 10 and the client units 20 store the image information which is related to the same document number and page number in the memory units 14 and 24, respectively.

After the distribution operation is completed, the distributed document image information is not yet displayed on the display unit 27. However, a telewriting operation for the image information which is displayed on the display unit 27 can be performed by performing the operations shown in FIGS. 8, 9 and 10.

Figure 16:
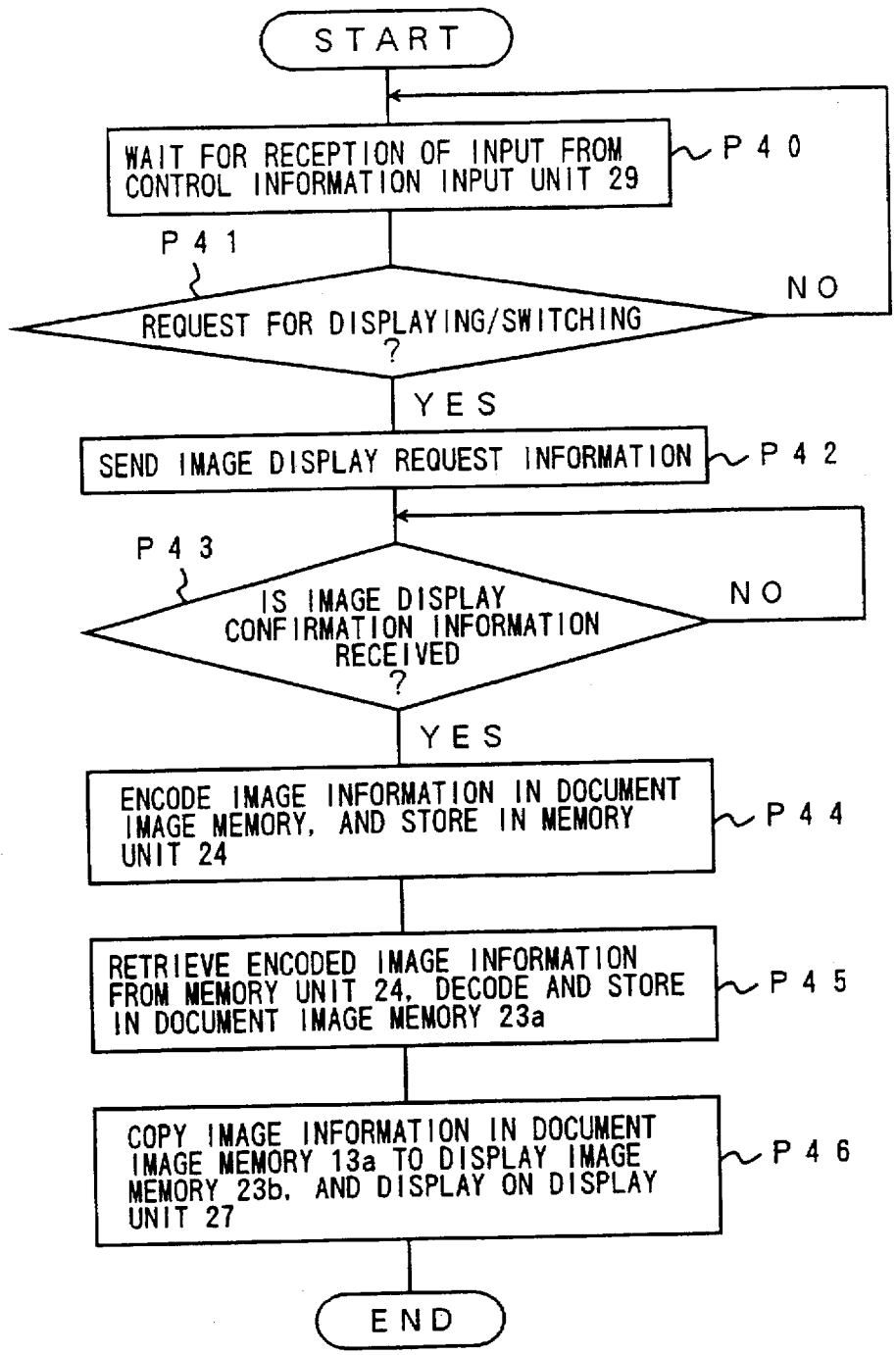
FIG. 16 is a flowchart of an operation for transmitting an instruction for displaying image information.
Figure 17:
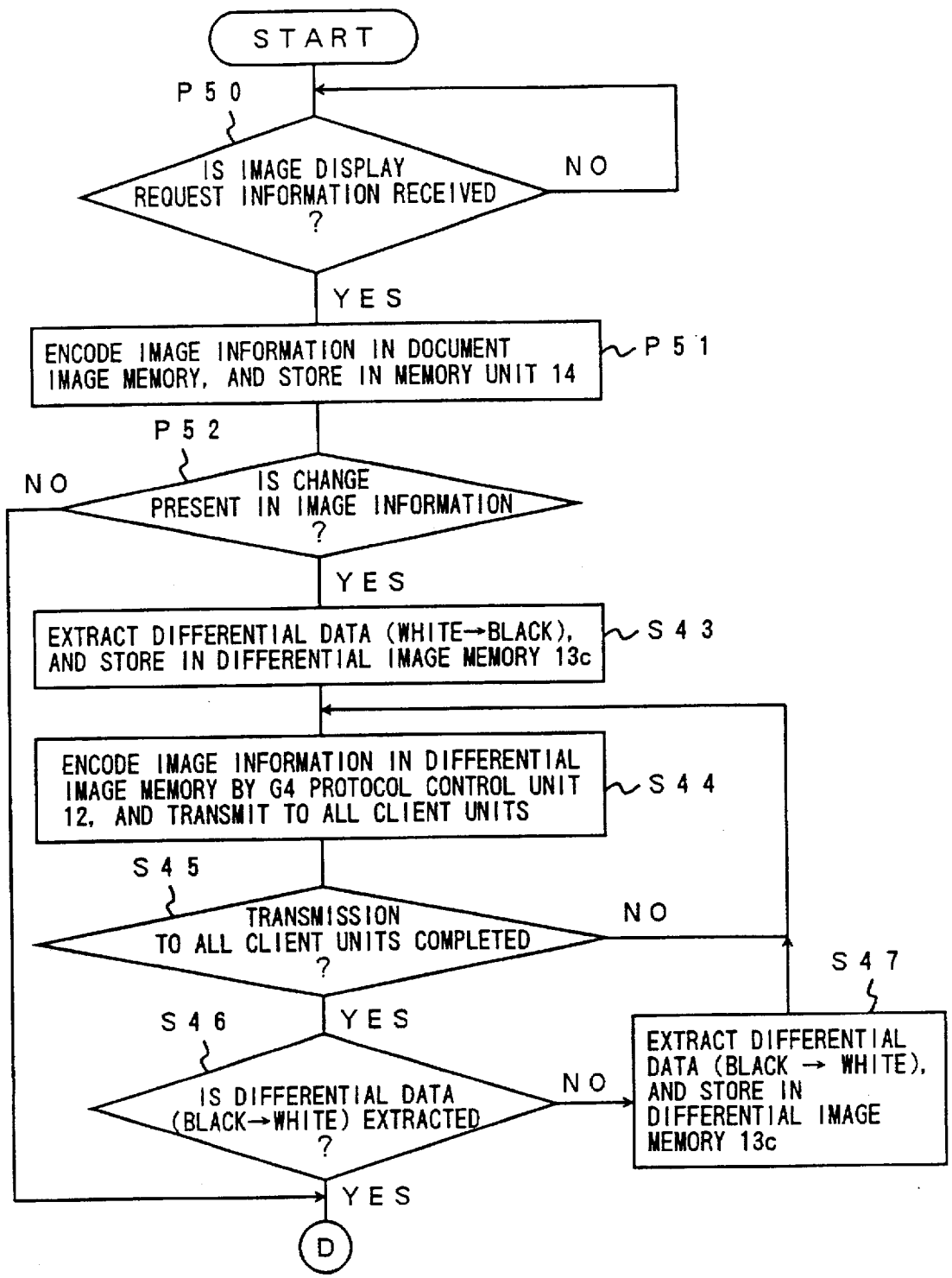

A description will now be given of a switching operation of the image information displayed on the display unit 27 of each of the client units 20 after performing the above-mentioned distribution operation of the image information. <<transmission of instruction for displaying the image information from the client units 20: refer to FIG. 16>>

The client unit 20 (for example, the terminal A) waits for, in step P40, an input of a request for displaying/switching the image information displayed on the display unit 27 from the control information input unit 29. If it is determined, in step P41, that the request is received, the client unit 20 sends information for requesting a display of the image information (image display request information) to the server unit 10 in step P41. The image display request information includes, as shown in FIG. 20A, information for a type of command (request), a command code (image display), a document number (=N), a display area (=m) and a page number (=n). Thus, the operation for displaying/switching the image information displayed on the display unit 27 is started. The document number N indicates the image information which is requested to be displayed on the display unit 27. The display area m designates the area of the screen in which the image information is displayed when a plurality of images are displayed on the same screen such as a multi-window screen. The page number n indicates the page number of the original document of which corresponding image information is stored in the memory units 14 and 24. FIGS. 20A to 20D shot examples of the data format of information transmitted between the server unit 10 and the client units 20. By sending such information, addition, change or deletion of information can be performed.

If it is determined, in step P43, that image display confirmation information including the type of command (confirmation) is received, the image information which is being displayed on the display unit 27 is encoded and stored, in step P44, in the memory unit 24. If the display unit 27 is displaying no image (displaying a white image), the image information corresponding to the white image is overwritten by the image information in the memory unit 24. If the display unit 27 is displaying an image, the image information in the memory unit 24 is overwritten by the encoded image information. If it is determined, in step P43, that the image display instruction information including the type of command (instruction) as shown in FIG. 20B is received, it is determined that an operation is requested by other client units 20 at the same time. Thus, the image information in the memory unit 24 is related to the document number N included in the instruction information received from the server unit 10, and the image information received and stored in the memory unit 24 is displayed on the display unit 27.

That is, in step P45, the encoded image information in the memory unit 24 is retrieved by referring to the document number N and the page number n, and the retrieved image information is decoded. The decoded image information is then stored in the document image memory 23a of the image memory unit 23. Thereafter, the image data stored in the document image memory 23a is copied, in step P46, to the display image memory 23b, and the image information in the display image memory 23b is displayed on the display unit 27. It should be noted that if the display unit 27 is a multi-window type, the area of image information on the display unit 27 is designated by referring to the display area m included in the image display confirmation information. <<reception of instruction for displaying the image information from the client units 20: refer to FIGS. 17 and 18>>

When the server unit 10 receives, in step P50, the image information request information from the client unit 20 (for example, the terminal A), the image information stored in the document image memory 13a of the image memory unit 13 is encoded and stored in the memory unit 14 in step P51. At this time, if no image is displayed on the display unit 27, it is not necessary to perform this operation because there is no image information stored in the document image memory 13a.

Thereafter, in step P52, it is determined whether or not the image information has been changed by comparing the image information stored in the document image memory 13a with the image information stored in the transmission image memory 13b. If it is determined that no change has been made, the routine proceeds to step P53 so as to switch the image information displayed on the display unit 27 to the image information designated by the document number N. If it is determined, in step P52, that a change has been made, the steps S43 to S47 are performed. That is, the data (first data) changed from white data represented by "0" to black data represented by "1" is extracted as the differential data, and the first data is distributed to each of the client units 20. Thereafter, the data (second data) changed from black data represented by "1" to white data represented by "0" is extracted as the differential data, and the second data is distributed to each of the client units 20.

Accordingly, when the image information in the document image memory 13a has been changed by the drawing information, the differential data between the image information in the document image memory 13a and the image data in the transmission image memory 13b is distributed to the client units 20. Thus, the same change is made to the image information in each of the client units 20 before the image information displayed on the display unit 27 is switched. Thus, there is no difference between the image information displayed on the display unit of each of the client units 20.

Then, the encoded image data in the memory unit 14 is retrieved, in step P53, by referring to the document number N and the page number n which are included in the image display request information sent from the client unit 20. The encoded image information is decoded, and stored in the document image memory 13a of the image memory unit 13. Thereafter, in step P54, the image display instruction information is sent to the client units 20 (the terminals B, C, D) other than the client unit 20 (the terminal A) which sent the image display request information. The image display instruction information includes, as shown in FIG. 20C, the document number N and the page number n. If it is determined, in step P55, that the image display response information is received from the client unit 20 (the terminal A), the image display confirmation information is sent, in step P56, to the sender of the image display request information. Then the operation is ended.

In this embodiment, the image information to be stored in the document image memory 13a is stored in the memory unit 14 before the change of the image information is made in steps S43 to S47. Thus, the image information received after step S43 is ignored. However, steps S43 to S47 may be repeated by determining the presence of change of the image information as is performed in step P52 after performing step S46. By doing this, if the image display request information and the drawing information are received at the same time, the switching of the displayed image information can be interrupted to perform a change of the displayed image information first. Thus, there is no condition in which the change is not performed even when the drawing information has been sent to the server unit 10. <<reception of instruction for displaying the image information from the server unit 10: refer to FIG. 19>>

If it is determined, in step P60, that image display instruction information is received, the image information which is being displayed on the display unit 27 is encoded and stored, in step P61, in the memory unit 24. If the display unit is displaying no image (displaying a white image), the image information corresponding to the white image is overwritten by the image information in the memory unit 24. If the display unit is displaying an image, the image information in the memory unit 24 is overwritten by the encoded image information. Then, in step S62, the encoded image information in the memory unit 24 is retrieved by referring to the document number N and the page number n, and the retrieved image information is decoded. The decoded image information is then stored in the document image memory 23a of the image memory unit 23. Thereafter, the image data stored in the document image memory 23a is copied to the display image memory 23b, and the image information in the display image memory 23b is displayed on the display unit 27. After that, in step P63, the image display response information is sent to the server unit 10, and the operation is ended.

After the distribution operation is completed, a telewriting operation for the image information which is displayed on the display unit 27 can be performed by performing the operations shown in FIGS. 8, 9 and 10. As mentioned above, in the present invention, the image information displayed on the display unit 27 is stored in the memory units 14 and 24 by relating the information indicating the document number N and the page number n to the image information. When the image display request information including the document number N and the page number n is input from the control information input unit 29 of the client unit 20, the image information being displayed on the display unit 27 is stored in the memory units 14 and 24 by overwriting in accordance with the request. The requested image information is retrieved from the memory units 14 and 24, and the image information being displayed on the display unit 27 is switched to the retrieved image information. Thus, the image information corresponding to the original document having a plurality of pages or the image information sent from each client unit 20 can be reliably retained. If a change has been made to the displayed image, the image displayed on the display unit 27 is switched according to the request after the image information corresponding to the changed image was stored. Thus, it is not necessary to distribute the image information each time the image on the display unit is switched by storing a plurality of sets of image information, resulting in elimination of complex and inconvenient operations. Additionally, a telewriting operation can be performed on different images without loosing the changed image on the display unit 27. The switching operation of the displayed image is easily and reliably performed due to the document number N and the page number n related to the image information. There is no inconsistency between the displayed images of the client units 20.

When the request for changing the displayed image and the request for switching the displayed image are made at the same time, the switching operation is interrupted and the changing operation is performed first. Thus, there is no inconsistency between the displayed images of the client units 20. Additionally, the switching of the displayed image can be performed without loosing the changed image.

In the present embodiment, the image information is stored in the memory unit 24 of each of the client units 20 by being related with the document number N. The same effect may be obtained by distributing the image information from the server unit 10 to the client units 20 each time a request for switching the displayed image is made. In this case, only the server unit 10 stores the image information. Thus, a memory size of the client units 20 may be reduced. However, since the image information must be distributed each time the displayed image is switched, the present embodiment is preferable when a quick processing time is desired.

The present invention is not limited to the specifically disclosed embodiments, and variations and modifications may be made without departing from the scope of the present invention.

What is claimed is:

1. A telewriting system comprising:

a plurality of telewriting terminals connected with a communication line, each of said telewriting terminals having a display unit so as to display an image thereon, the image displayed on said display unit being changed in accordance with instruction information transmitted via the communication line; and a server unit connected to each of said telewriting terminals by the communication line, said server unit comprising, communication means for communicating the instruction information and image information with each of said telewriting terminals via the communication line, an image memory for storing image information corresponding to an image displayed on said display unit at of each of said telewriting terminals, change means for changing the image information to be stored in said image memory, when the instruction information requesting a change of the image is received from at least one of said telewriting terminals, in accordance with the received instruction information, differential information extraction means for extracting differential information between the image information before the change and the image information after the change, and distribution means for distributing the differential information to each of said plurality of telewriting terminals, wherein said plurality of telewriting terminals are configured to adjust said image displayed on said display unit based on said differential information provided from said distribution means.

2. The telewriting system as claimed in claim 1, wherein the image information comprises binary image data having a first value representing white and a second value representing black, said differential information extraction means comprises first extraction means and second extraction means, and said first extraction means extracting the binary image data changed from said first value to said second value to obtain first differential information, said second extraction means extracting the binary image information changed from said second value to said first value to obtain second differential information, said first differential data being distributed separately from said second differential information.

3. The telewriting system as claimed in claim 1, wherein each of said telewriting terminals comprises display control means for displaying the image which is being changed through the display unit thereof.

4. The telewriting system as claimed in claim 1, wherein each of said telewriting terminals comprises transmission request input means for inputting transmission request information for requesting transmission of the image information of the image displayed on the display unit of a remote telewriting terminal, and said server unit comprises lump transmission means for transmitting the whole image information stored in said image memory to at least one of said telewriting terminals when the transmission request information is received from said at least one of said telewriting terminals.

5. The telewriting system as claimed in claim 1, wherein each of said telewriting terminals comprises switch request input means for inputting switch request information for requesting switching of the image displayed on the display unit, said telewriting system further comprising:

a memory unit storing the image information to be displayed on the display unit of each of said telewriting terminals; and switch control means for switching a first image being displayed on the display unit to a second image, a switching operation being performed after the image information corresponding to said first image is stored in said memory unit, the image information corresponding to said second image being retrieved from said memory unit.

6. The telewriting system as claimed in claim 5, wherein said memory unit and said switch control means are provided in said server unit.

7. The telewriting system as claimed in claim 5, wherein the image information stored in said memory unit is related to display instruction information including a reference number designating each image information, said switch control means switching the image displayed on the display unit by retrieving the image information from said memory unit by referring to the display instruction information.

8. The telewriting system as claimed in claim 5, wherein said switch control unit interrupts a switching operation performed in accordance with the switch request information when the instruction information is received from one of said telewriting terminals.

9. The telewriting system as claimed in claim 1, wherein said distribution means distributes the differential information in accordance with a receiving order of the instruction information so that the differential information corresponding to the instruction information received first is distributed first.

10. A telewriting system comprising:
a server unit connected with a communication line for transmitting an instruction information having a distribution means for distributing image differential information; and a plurality of telewriting terminals, each of said telewriting terminals comprising, a display unit configured to display an image thereon, the image displayed on said display unit being changed in accordance with instruction information transmitted from said server unit via the communication line, communication means for communicating the instruction information and image information between each of said telewriting terminals via the communication line and said server unit, and change means for changing the image information corresponding to the image displayed on the display unit when the instruction information requesting a change of the image is received, the instruction information including the differential information between the image information before the change and the image information after the change.

11. The telewriting system as claimed in claim 10, wherein the image information comprises binary image data having a first value representing white and a second value representing black, the differential information including first differential information obtained by extracting the binary image data changed from said first value to said second value and second differential information obtained by extracting the binary image data changed from said second value to said first value, and said change means comprises:

discrimination means for discriminating the differential information to be one of said first differential information and said second differential information; and process means for processing the image information in accordance with a result of discrimination made by said discrimination means, a logical sum being performed on the image information with the differential information when the differential information is discriminated as the first differential information, a logical multiplication being performed on the image information with the differential information when the differential information is discriminated as the second differential information.

12. The telewriting system as claimed in claim 10, wherein each of said telewriting terminals comprises display control means for displaying the image which is being changed through the display unit thereof.

13. The telewriting system as claimed in claim 10, wherein each of said telewriting terminals comprises switch request input means for inputting switch request information for requesting switching of the image displayed on the display unit, said telewriting system further comprising:

a memory unit storing the image information to be displayed on the display unit of each of said telewriting terminals; and switch control means for switching a first image being displayed on the display unit to a second image, a switching operation being performed after the image information corresponding to said first image is stored in said memory unit, the image information corresponding to said second image being retrieved from said memory unit.

14. The telewriting system as claimed in claim 13, wherein the image information stored in said memory unit is related to display instruction information including a reference number designating each image information, said switch control means switching the image displayed on the display unit by retrieving the image information from said memory unit by referring to the display instruction information.

15. The telewriting system as claimed in claim 13, wherein said switch control unit interrupts a switching operation performed in accordance with the switch request information when the instruction information is received from one of said telewriting terminals.

* * * * *